US012261845B2

(12) United States Patent
Schulte

(10) Patent No.: US 12,261,845 B2
(45) Date of Patent: Mar. 25, 2025

(54) METHODS AND APPARATUS TO SHARE TRUST BETWEEN NETWORKS

(71) Applicant: Skyhigh Security LLC, San Jose, CA (US)

(72) Inventor: Felix Schulte, Paderborn (DE)

(73) Assignee: Skyhigh Security LLC, Plano, TX (US)

( * ) Notice: Subject to any disclaimer, the term of this patent is extended or adjusted under 35 U.S.C. 154(b) by 265 days.

(21) Appl. No.: 18/148,353

(22) Filed: Dec. 29, 2022

(65) Prior Publication Data
US 2024/0223558 A1    Jul. 4, 2024

(51) Int. Cl.
*H04L 9/40* (2022.01)
(52) U.S. Cl.
CPC ...... *H04L 63/0884* (2013.01); *H04L 63/0838* (2013.01)

(58) Field of Classification Search
None
See application file for complete search history.

(56) References Cited

U.S. PATENT DOCUMENTS

2020/0177577 A1* 6/2020 Jerrard-Dunne ...... H04L 51/046

* cited by examiner

*Primary Examiner* — Cai Y Chen
(74) *Attorney, Agent, or Firm* — Byrne Poh LLP

(57) ABSTRACT

Methods, apparatus, systems, and articles of manufacture are disclosed. An example apparatus to share trust between networks includes trust link former circuitry to form trust with an identity provider (IDP) device separate from the apparatus; interface circuitry to obtain credentials from a client device, the client device and the apparatus connected in a network that does not include the IDP device; and mint requester circuitry to cause the IDP device to mint a token based on the credentials, wherein the interface circuitry further to: obtain the token from the IDP device; and forward the token to the client device.

7 Claims, 14 Drawing Sheets

ASSERTION PSEUDOCODE 402
```
{
    "trusted_issuer": "idp_104a.mycompany.cloud",
    "exp": 234,
    "nbf": 123
}
.
<RSA signature from private key of IDP 104B>
```

TOKEN PSEUDOCODE 404
```
{
    "token_issuer": "idp_104a.mycompany.cloud",
    "friend_issuers": [
        {
            "issuer": "idp_104b.mycompany.cloud",
            "assertion": <a signed document, showing that IDP_104B trusts IDP_104A>
        }
    ]
}
<RSA signature from private key of IDP A>
```

FIG. 4

METHODS AND APPARATUS TO SHARE TRUST BETWEEN NETWORKS

FIELD OF THE DISCLOSURE

This disclosure relates generally to networks and, more particularly, to methods and apparatus to share trust between networks.

BACKGROUND

Compute networks refer to a set of compute devices that connect to one another. In many examples, compute devices within a network work together to provide a service. For example, devices in a compute network may perform operations that include, but are not limited to, obtaining data, storing data, transmitting data, processing data, etc. In recent years, compute networks for commercial enterprises have become increasingly complex to accommodate various scaling and globalization efforts.

BRIEF DESCRIPTION OF THE DRAWINGS

FIG. 4 is an illustrative example of pseudocode that may be executed under DTIT.

In general, the same reference numbers will be used throughout the drawing(s) and accompanying written description to refer to the same or like parts. The figures are not to scale.

Figure 1:
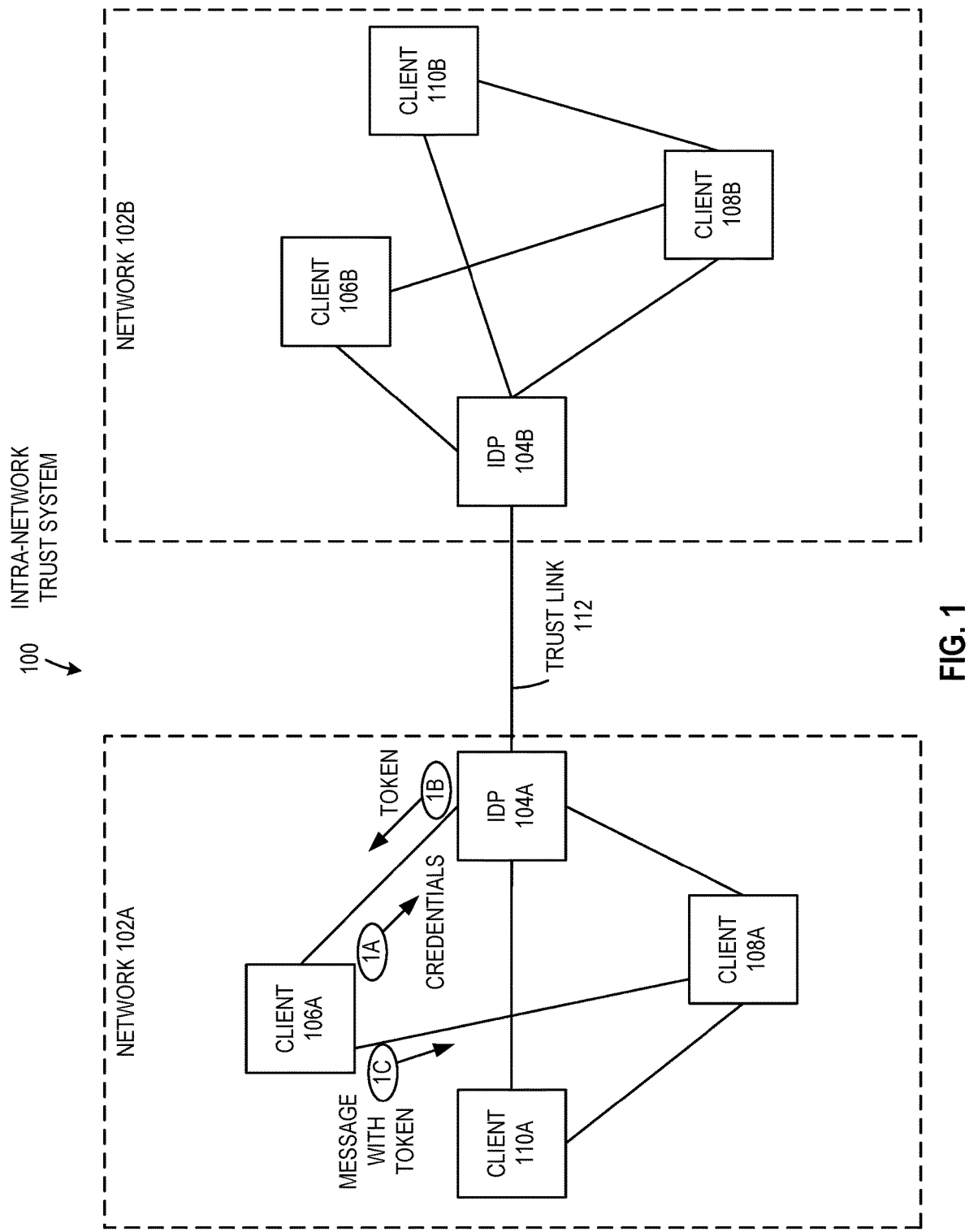
FIG. 1 is an example block diagram of two networks connected by a trust link.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

To keep their services secure, businesses may determine specific types and amounts of trust that compute devices within a network share with one another. As used herein, trust refers to a relationship between two compute devices that enables the two devices to exchange data. For example, a first compute device that trusts a second compute device may be permitted to receive instructions from the second compute device, perform operations based on the instructions, send a response to the instructions, etc. In contrast, the first compute device may be restricted from receiving, interpreting, or otherwise interpreting data that is sent from an untrusted third compute device.

Some compute networks may be defined based on trust that is shared between compute devices. For example, an authorization realm refers to a compute network defined by an IDP device that connects to a plurality of client devices. The IDP device is a compute device used to coordinate the network by assigning identities, capabilities, and/or policies to the client devices. To enable such coordination, each client device within an authorization realm trusts the IDP device by default.

A client device refers to a compute device in an authorization realm that performs operations based on the IDP device. While some client devices in some authorization realms may communicate with one another to provide a service, other client devices may only communicate with the IDP device. As a result, client devices within an authorization realm do not trust one another by default. Rather, an IDP device may establish trust between specific pairs of client devices as needed. Establishing trust between client devices is discussed further in connection with FIG. 1. To provide security, client devices within an authorization realm do not, by default, trust devices positioned outside of the network (i.e., compute devices without a relationship to the IDP device).

Businesses may implement an authorization realm architecture to effectively manage a plurality of client devices with an IDP. Additionally or alternatively, some businesses that manage one or more client devices may use an authorization realm architecture so that a separately managed, trusted IDP device can manage identities for the client devices. In doing so, such businesses may be able to mitigate the operating cost and complexity of the client device.

In some examples, a first authorization realm is required to merge with a second authorization realm. Authorization realms may merge for any reason. For example, a new business relationship between two companies such as a merger, divesture, joint venture, etc. may result in two companies modifying and/or combining their compute resources and services. To enable the sharing of services, data, etc. between companies, the authorization realm of a first company may be required to merge with the authorization realm of a second company.

Two authorization realms may merge as a way of establishing new communication between devices. For example, a merger may require any number of first devices in a first authorization realm to communicate with any number of second devices in a second authorization realm. In some examples, merging authorization realms is referred to as sharing trust.

Some previous approaches to share trust may attempt to connect every client device in the network to every IDP device in the network. In such an approach, any client device in a first authorization realm could establish communication with any other client device in a second authorization realm using the shared trust in the IDP devices. However, connecting every client device from two authorization realms to new IDP devices may require the manual reconfiguration of a large number of devices. As such, sharing trust using such previous approaches lacks scalability. Furthermore, sharing trust in such a manner increases the complexity of the network due to the large number of client devices each IDP is required to trust and manage.

Examples methods, apparatus, and systems described herein efficiently share trust between authorization realms to enable scalability and mitigate added complexity. To merge authorization realms, example IDP devices from separate networks establish trust links between one another. Examples described herein describe Remote Token Minting (RTM), Dynamic Transitive Issuer Trust (DTIT), and authorization server blending techniques that share trust with client devices using the trust link between IDP devices. As a result, two example client devices from previously separate networks can establish trust and exchange data without needing to connect to each example IDP in the merged authorization realm.

FIG. 1 is an example block diagram of two networks connected by a trust link. FIG. 1 shows the example intranetwork trust system 100, which includes example networks 102A, 102B. The example network 102A includes an example IDP device 104A and example client devices 106A, 108A, 110A. Similarly, the example network 102B includes an example IDP device 104B and example client devices 106B, 108B, 110B. The example diagram of FIG. 1 illustrates example operations 1A, 1B, 1C. Separate from the intra-network trust system 100, FIG. 1 additionally includes the example trust link 112.

The example networks 102A, 102B are two authorization realms that are merged together via the example trust link 112. In examples described herein, a network is defined by one IDP device and the one or more client devices that connect to the IDP device. In FIG. 1, each network 102A, 102B includes three client devices for simplicity. In practice, one or more of the example networks 102A, 102B may have a different number of client devices connected to their respective IDP device.

The example networks 102A, 102B of FIG. 1 connect and facilitate communication between their respective IDP device and client devices. In examples disclosed herein, the example networks 102A, 102B are implemented by the Internet. However, one or more of the example networks 102A, 102B may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate," including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example IDP devices 104A, 104B manage the example networks 102A, 102B, respectively by providing identities, capabilities, and policies to client devices, and by establishing trust between client devices. The example IDP device 104A, 104B may be implemented by any device capable of storing and managing digital identities and credentials. For example, one or more of the IDP devices 104A, 104B may be managed by organizations that include but are not limited to social networks, banks, governments, etc. The example IDP devices 104A, 104B may be any implemented by any amount of compute resources.

The example client devices 106A, 108A, 110A perform operations using the identity information and/or roles provided by the example IDP device 104A. Similarly, the example client devices 106B, 108B, 110B perform operations based on the credentials and/or instructions provided by the example IDP device 104B.

In some examples, each of the client devices 106A, 108A, 110A in an example network 102A are be managed by the same organization. For example, a single organization may use an authorization realm to manage client devices that include but are not limited to digital cash registers at a store, individual drones that coordinate to provide aerial imagery, data servers managed by a social media platform, online game, or search engine, etc.

In other examples, one or more the client devices 106A, 108A, 110A of an example network 102A are independently managed. For example, suppose example client device 106A hosts a digital retail website, example client device 108A is a streaming video on demand (SVOD) server, and example client device 110 is an email server. In such examples, each of the client devices 106A, 108A, 110A are managed by a separate organization that each have a need to manage user accounts. Rather than develop three independent sets of secure authentication protocols, secure databases for user credentials, etc., the example client devices 106A, 108A, 110A may independently choose to trust the IDP device 104A to provide single sign on (SSO) functionality to their services. Examples of SSO providers include but are not limited to Google®, Facebook®, Microsoft®, etc.

In some examples, two client devices within the same authorization realm do not have a need to communicate, and therefore may not establish trust. For example, client devices 106A, 110 do not trust one another and client devices 106B, 110B do not trust one another.

In other examples, two client devices use an IDP device to establish trust and communicate with one another in an authorization realm. In the example block diagram of FIG. 1, two devices are connected if they trust one another and can exchange data. For example, the client device 106A trusts the IDP device 104A, and the client device 108A. To establish trust between two client devices, one of the client devices may request communication with the other client device. For example, suppose the client device 106A has a message to send to client device 108A, and trust has not yet been established. At example operation 1A, the client device 106A sends credentials to the IDP device 104A. The credentials may be a username and password, a client certificate, or other any other appropriate data structure as determined by the type of authentication procedure used within the authorization realm. At example operation 1B, the IDP device 104A creates a token based on the credentials and provides the token to the client device 106A. As used herein, a token refers to a data structure that is generated by an IDP device and represents the verification/authorization of the IDP device. In some examples, creating a token data structure is referred to as minting a token. Tokens are discussed further in connection with FIG. 4. At example operation 1C, the example client device 106A sends the token and the message to the example client device 108A. When the example client device 108A receives the message from the client device 108A, it can use the token to verify that client device 108A is trusted and verified by the example IDP device 104A. Therefore, the example client device 108A may securely perform operations based on the message, generate a response, or generally interact with the message. In doing so, trust between example client devices 106A, 108A is established.

While communication and messages may be shared freely between two client devices that trust one another, either of the client devices may terminate the trust for any reason. Reasons for terminating trust may include, but are not limited to, the passage of time, a change in geographic location, a policy change, etc. If a first client device wishes to send additional messages to a second client device after trust is terminated, the first client device may be required to re-establish trust with the second client device. The example intra-network system 100 may or may not permit trust to be re-established due to any of the foregoing reasons.

The example trust link 112 represents a shared state in which both example IDP devices 104A, 104B agree to trust one another and work together. The example trust link 112 adds to the functionality of the intra-network trust system 100 by enabling one or more client devices 106A, 108A, 110A, to communicate with one or more client devices 106B, 108B, 110B. In some examples, establishing the trust link 112 requires the IDP devices 104A, 104B to perform an authentication procedure. Additionally, establishing the example trust link 112 may include both of the example IDP devices 104A, 104B executing a shared protocol. In some examples, the shared protocol includes support of an Application Program Interface (API). The API may define a shared language (e.g., a standardized set of queries and responses) that the example IDP devices 104A, 104B use to communicate with one another.

In some examples, IDP device 104A is referred to as the friend IDP of the IDP device 104B, and vice versa, after the trust link 112 is established. While only one example trust link 112 is showed in FIG. 1 for simplicity, in other examples, an IDP device shares multiple trust links with multiple friend IDPs. The example trust link 112 is discussed further in FIGS. 3-10.

In some examples, a single organization uses the example trust link 112 to manage all of the compute devices within both example networks 102A, 102B. For example, suppose an organization provides services in two jurisdictions that have different privacy and data security regulations. Example implementations of privacy and data security regulations may include restricted read and write permissions based on the location of a client device. In some examples with such regulations, the organization makes two separate authorization realms (i.e., the example networks 102A, 102B) and merges the realms using the example trust link 112. In such a network architecture, the example IDP devices 104A, 104B execute local policies that enforce the regulations of their local jurisdictions. Additionally, the example IDP devices 104A, 104B use the example trust link 112 to establish communication across networks/jurisdictions when needed and permitted.

The merger of the example networks 102A, 102B may establish new connections between client devices. For example, suppose the client device 106A identifies and forms a message for the client device 106B. Under previous approaches, implementing such communication would require manual reconfiguration of the example networks 102A, 102B so that the client device 106A trusts the IDP device 104B and the connection procedure of the foregoing example can be used across networks. Advantageously, the example block diagram of FIG. 1 expands upon the intranetwork trust system 100 by implementing the example trust link 112 according to the teaching of the disclosure rather than a direct connection between the client device 106A and the IDP device 104B. Accordingly, a merged authorization realm using the example trust link 112 may use RTM, DTIT, or authorization realm blending techniques to establish communication between the example client devices 106A, 106B, in a more scalable and less complex manner than previous approaches.

Figure 2:
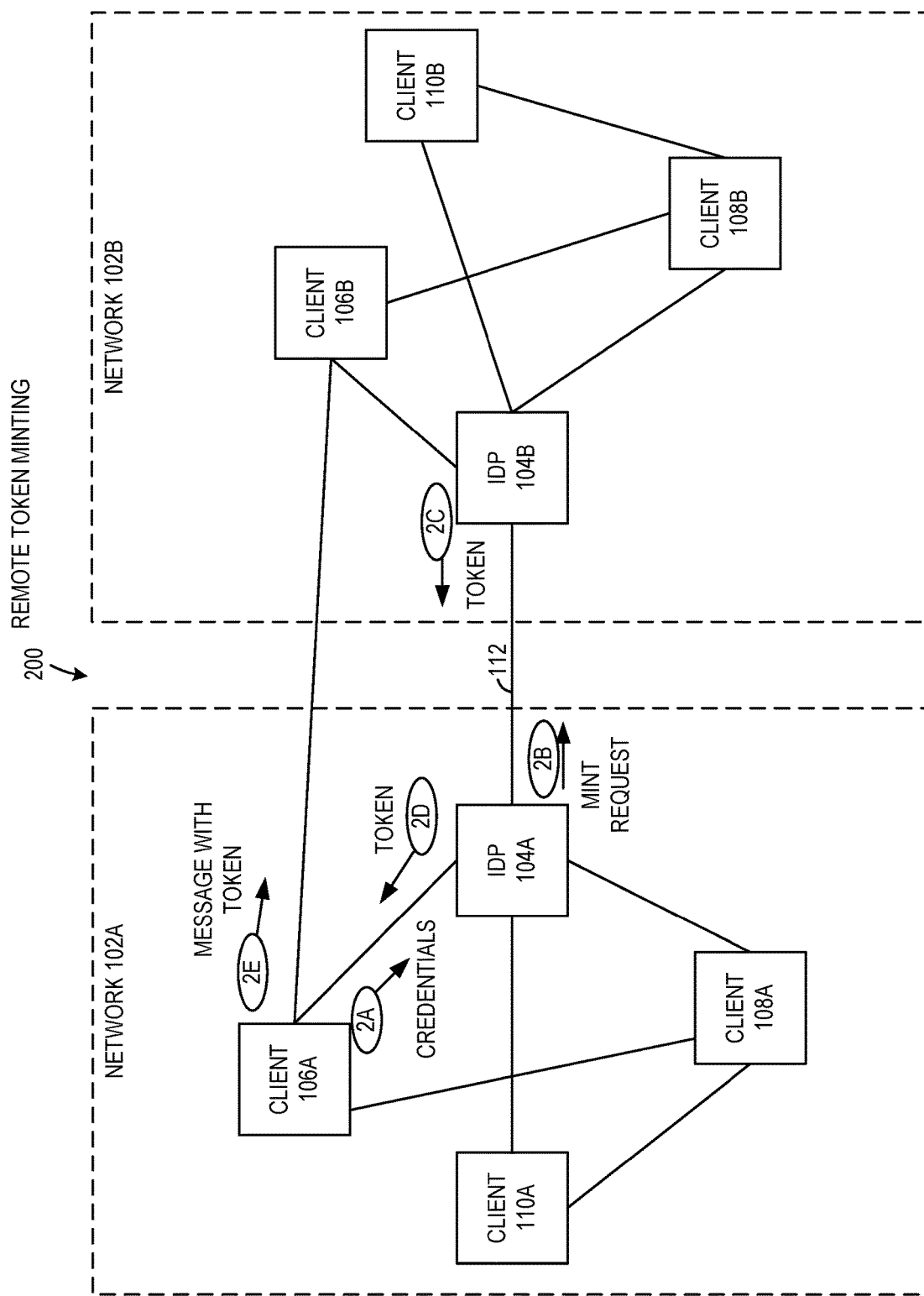
FIG. 2 is an illustrative example of Remote Token Minting (RTM) in the networks of FIG. 1.

FIG. 2 is an illustrative example of Remote Token Minting (RTM) in the example networks of FIG. 1. FIG. 2 shows the example RTM system 200, which includes the example networks 102A, 102B. The example network 102A includes the example IDP device 104A and the example client devices 106A, 108A, 110A. Similarly, the example network 102B includes the example IDP device 104B and the example client devices 106B, 108B, 110B. The example IDP devices 104A, 104B are connected by the example trust link 112. The example diagram of FIG. 2 illustrates example operations 2A, 2B, 2C, 2D.

At the beginning of the illustrative example of FIG. 2, trust between the example networks 102A, 102B has not yet been established. To establish the example trust link 112 using RTM, the example IDP device 104A may be provided the IP address of the IDP device 104B and example IDP device 104B may be provided the Internet Protocol (IP) address of the IDP device 104A. The IP addresses may be provided by any individual or system responsible for merging the example networks 102A, 102B.

Each of the example IDP devices 104A, 104B may use the IP address to engage in an authorization procedure. In some examples, each of the example IDP devices 104A, 104B verify and authorize the other IDP device by exchanging digital certificates via the IP addresses. Additionally or alternatively, the example IDP devices 104A, 104B may use the IP addresses to exchange public keys. When using cryptography to communicate securely, a device may have both a public key used to decrypt data and a private key used to encrypt data. Devices may share their public key with other devices to enable communication. In some examples, the IDP devices 104A, 104B exchange public keys by downloading JavaScript Object Notation (JSON) Web Keys (JWKs) at the IP address of the friend-IDP. A JWK refers to a set of public keys that are written in the JSON format, which is designed for data-interchange.

After the example trust link 112 is established, the example client device 106A identifies and forms a message to provide to the example client device 106B. The example client device 106A may attempt to communicate with the example client device 106B at any time once the trust link 112 is established.

At example operation 2A, the client device 106A sends credentials and audience data to the example IDP device 104A. As used herein, audience data refers to an identification of a receiver device that a transmitter device wishes to communicate with. In the illustrative example of FIG. 2, the audience data of the client device 106A identifies the client device 106B.

At example operation 2B, the example IDP device 104A uses the audience data to determine the receiver device is located in an external authorization realm that is connected by a network. The IDP device 104A does not share trust with the example client devices 106B, 108B, 110B and therefore cannot generate tokens for the example client devices 106B, 108B, 110B. Instead, the example IDP device 104A also sends a mint request to the example IDP device 104B at example operation 2B. The mint request includes data describing the transmitter (i.e., the example client device 106A) and the audience (i.e., the example client device 106B).

At example operation 2C, the example IDP device 104B validates the mint request. To validate the mint request, the example IDP device 104B may check to see if the message is within the allowable scope of the audience. The allowable scope of messages may be determined by the organization that manage the IDP device 104B. A scope of allowable messages may include or exclude certain messages for any reason. For example, the allowable scope may describe which messages are allowed based on factors that include but are not limited to the type of compute device of the transmitter, the location of the transmitter, the time the message will be sent, etc. In other examples, the example IDP device 104B validates the transmitter device (e.g., the client device 106A) as a whole rather than a specific message.

At example operation 2C, the example IDP device 104B also mints a token based on the validated mint request and provides the token to the example IDP device 104A. The token certifies that the IDP device 104B trusts the transmitter device (i.e., the example client device 106A) and its request to contact the device from the audience data. In some examples, the example IDP device 104B signs the token with a cryptographic function to prove the token was actually minted by the IDP device 104B. At example operation 2D, the example IDP device 104A receives the token and forwards the token to the example client device 106A.

At example operation 2E, the client device 106A sends the token and the message to the example client device 106B. In some examples, the client device 106A sends the token, waits to receive an acknowledgement message from the example client device 106B, and then sends the message. In other examples, the client device 106A sends the token and the message concurrently. The example client device 106B uses the token as proof that the example IDP device 104B trusts the client device 106A. The trust from the example IDP device 104B allows the client device 106B to interact with the message, thereby enabling trust and communication between the example client devices 106A, 106B.

While the illustrative example of FIG. 2 illustrates one example implementation of the example RTM system 200, other implementations may exist. For example, rather than sending a mint request at operation 2B, in some examples, the IDP device 104A provide the IP address of the IDP device 104B and a One Time Password (OTP) to the client device 106. In such examples, the client device 106A sends the OTP and a mint request to the IDP device 104B. The IDP device 104B may interpret the OTP using the shared protocol to indicate the IDP device 104A trusts the client device 106A and authorizes the mint request. In other examples, the IDP device 104B may provide signed assertion data in addition to/replacement of the OTP. The example IDP device 104B interprets the signed assertion data and the OTP similarly in that receiving either data structure enables operation 2D.

RTM refers to a technique to share trust in which a token for a transmitter device is minted remotely (i.e., minted by an IDP device that is external to the authorization realm of the transmitter device). Advantageously, RTM may be implemented using only a shared protocol between the example IDP devices 104A, 104B. As a result, the example client devices 106A, 108A, 110A can communicate with the example client devices, 106B, 108B, 110B without the need for any of the client devices to be re-configured. Such a configuration reduces complexity when compared to previous approaches to share trust. Furthermore, the IDP devices 104A, 104B control the privileges, identities, and scope of allowed messages of the client devices within their respective networks 102A. 102B using RTM techniques. Such a configuration may increase scalability when compared to previous approaches to share trust.

While RTM may cause an increase in latency between (1) when a transmitter client device first generates a message for an untrusted audience client device and (2) when the audience client device responds or otherwise interacts to the transmitted message, the latency is mitigated using caches. In the example RTM system 200, the IDP devices 104A includes a cache that stores a remote minted token (i.e., the token printed by IDP device 104B) after an initial set of credentials and audience data are provided by the client device 106A. As a result, if the IDP device 104A receives a subsequent request from the client device 106A with the same credentials and audience data, and if the token in the cache is unexpired at the time of the subsequent request, the IDP device 104A can re-provide the token in the cache instead of sending an additional mint request to the IDP device 104B.

Figure 3:
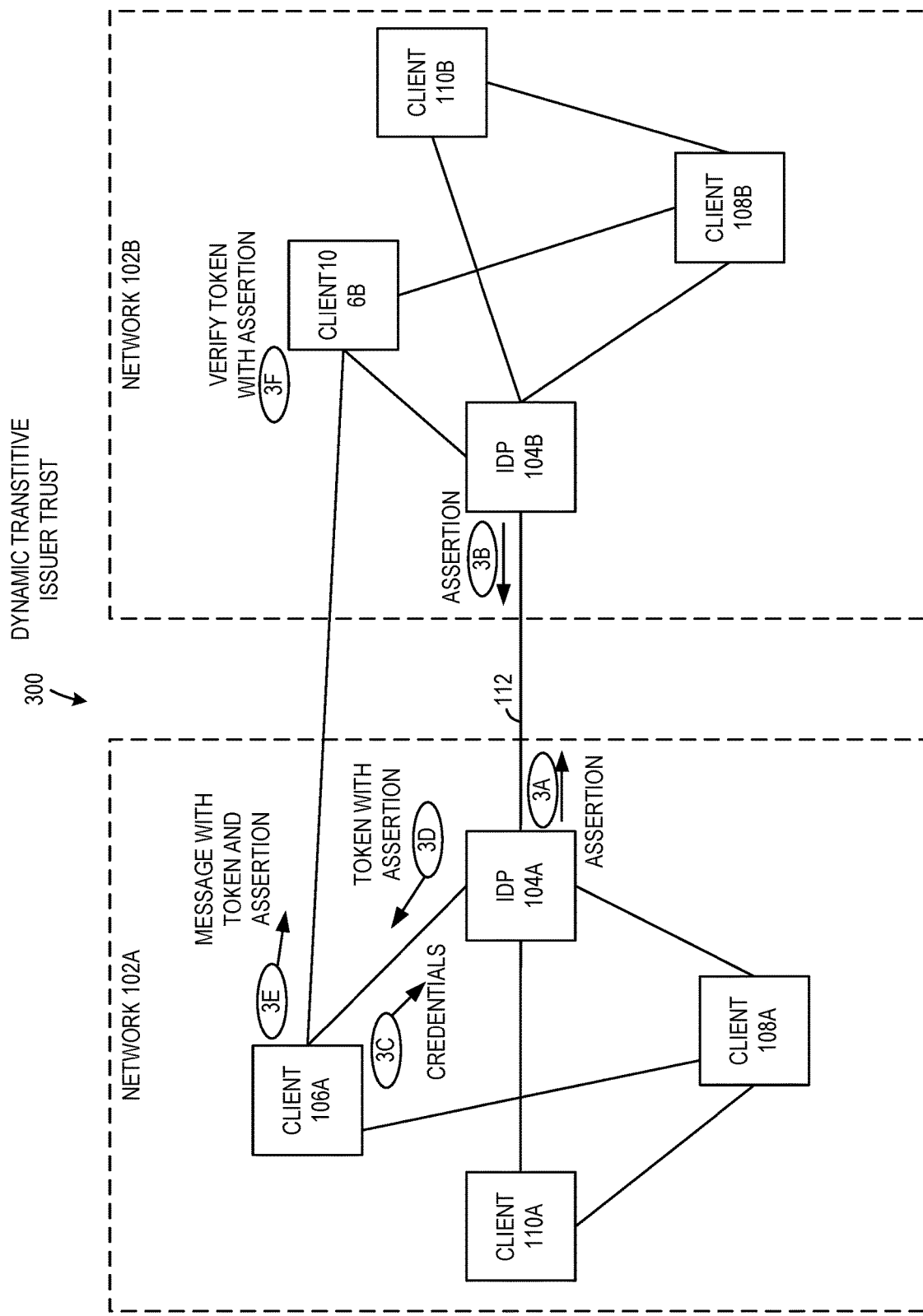
FIG. 3 is an illustrative example of Dynamic Transitive Issuer Trust (DTIT) in the networks of FIG. 1.

FIG. 3 is an illustrative example of Dynamic Transitive Issuer Trust (DTIT) in the networks of FIG. 1. FIG. 3 describes the example DTIT system 300, which includes the example networks 102A, 102B. The example network 102A includes the example IDP device 104A and the example client devices 106A, 108A, 110A. Similarly, the example network 102B includes the example IDP device 104B and the example client devices 106B, 108B, 110B. The example IDP devices 104A, 104B are connected by the example trust link 112. The diagram of FIG. 3 illustrates example operations 3A, 3B, 3C, 3D, 3E, 3F.

At the beginning of the illustrative example of FIG. 3, trust between the example networks 102A, 102B has not yet been established. To establish the example trust link 112 using DTIT, the example IDP devices 104A, 104B may receive one another's IP address and use the address to engage in an authorization procedure as described previously in connection with FIG. 2.

At example operations 3A, 3B, the IDP devices 104A, 104B exchange assertions with one another. An assertion refers to an amount of data generated by an IDP device that indicates the IDP device trusts the recipient of the assertion data. To verify an assertion was sent by the IDP device claimed in the data, IDP devices may attach a cryptographical signature to the assertion. The example IDP devices 104A, 104B may exchange assertions through any means. In one such example, the IDP device 104A uses an API call to request an assertion from the IDP device 104B. In such examples, the IDP device 104B uses the same API call to request an assertion from the IDP device 104A.

In the illustrative example of FIG. 3, operation 3A, the transmission of the assertion from IDP device 104A, is labelled as occurring before operation 3B, the transmission of the assertion from IDP device 104B. In other examples, operations 3A, 3B occur concurrently, or operation 3B may occur before operation 3A.

In some examples, the assertions are time sensitive and include expiration data. As a result, the example IDP devices 104A, 104B may regularly repeat operations 3A, 3B to renew their assertions. Time sensitive, expiring assertions help maintain security in the example DTIT system 300 by mitigating any damage that may occur to an example network 102A if the IDP devices 104B of the other network were to become compromised. The example trust link 112 can be used to share trust between example networks 102A, 102B once operations 3A and 3B are complete.

After operations 3A and 3B are complete, the example client device 106A identifies and forms a message to provide to the example client device 106B. The example client device 106A may attempt to communicate with the example client device 106B at any time during which (a) the trust link 112 is established and (b) both IDP devices 104A, 104B have valid, unexpired assertions from the friend IDP.

At example operation 3C, the client device 106A sends credentials and audience data to the IDP device 104A. Upon receiving the credentials, the example IDP device 104A checks whether it has a valid, unexpired assertion from the IDP device 104B. If the assertion is expired at the time the credentials are received, the IDP device 104A requests a new and unexpired assertion from the friend IDP. The IDP device 104A also uses the audience data to check whether the IDP device 104B authorizes communication between the client device 106A and client device 106B.

Once the example IDP device 104A has a valid assertion and confirms the requested communication is authorized, the IDP device 104A mints a token that includes an embedded, valid assertion at operation 3D. Additionally, the example IDP device 104A provides the token with the embedded assertion to the example client device 106A at operation 3D.

At example operation 3E, the example client device 106A provides the message and the token with the embedded assertion to the example client device 106B. In many examples, client devices only respond to tokens that were minted by the IDP device within their own authorization realm. At operation 3F, however, the example client device 106B extracts the assertion from the token to determine that IDP device 104B trusts the IDP device 104A. Based on the assertion from IDP device 104A, the example client device 106B may respond to the message from the client device 106A, perform operations based on the message, etc.

As used herein, verification of a token refers to when a client device in a first network extracts an assertion from a token to determine that the IDP device from the first network trusts a IDP device from a second network. In some examples, a client device 106B verifies the token using its own compute resources. In other examples, the client device 106B provides the token to the IDP device 104B for verification.

Advantageously, sharing trust using the example DTIT system 300 removes the need for client devices 106A, 108A, 110A to connect to an IDP device 104B from an external network. As a result, the example DTIT system 300 enables more scaling and reduce complexity when compared to previous approaches to share trust.

Sharing trust using the example DTIT system 300 enables a transitive expansion of trust. For example, the exchange of assertions at operations 3A, 3B means that because the client devices 106B, 108B, 110B each trust the example IDP device 104B, the client devices 106B, 108B, 110B also implicitly trust any client device the IDP device 104A provides a copy of the assertion to. Therefore, the IDP devices 104A, 104B using DTIT do not have to mint tokens on a case by case basis for specific connections between client devices, as seen in RTM. As a result, the example DTIT system 300 may experience lower latency in establishing trust between client devices when compared to the example RTM system 200. However, the example DTIT system 300 may require client devices to be configured with additional instructions to perform verification at operation 3F, while RTM system 200 does not require any modifications to the client devices. In some examples, client devices with the example DTIT system 300 is updated on an as needed basis. An example organization managing one or more devices in the example networks 102A, 102B may decide whether to share trust using the example RTM system 200, example DTIT system 300, or example authorization realm blending system 500 based on a variety of factors. Factors used to choose between trust sharing techniques of this disclosure are discussed further in connection with between FIG. 5.

FIG. 4 is an illustrative example of pseudocode that may be executed under DTIT. FIG. 4 includes example assertion pseudocode 402 and example token pseudocode 404. In examples described above and herein, tokens are implemented by JSON Web Tokens (JWTs). Accordingly, in the illustrative example of FIG. 4, the example assertion pseudocode 402 and example token pseudocode 404 may include terminology specific to JWT programming. In general, however, tokens generated in the example RTM, DTIT, and authorization realm blending techniques of this disclosure may be implemented using any type and any format of token. In other examples that do not implement JWTs, JWT specific parameters that are described in the example assertion pseudocode 402 and the example token pseudocode 404 of FIG. 4 may instead be implemented by alternative, logically equivalent data structures.

The example assertion pseudocode 402 describes information that may be transmitted by the IDP device 104B to the IDP device 104A at example operation 3B. The example assertion pseudocode 402 includes a trusted_issuer parameter. The trusted_issuer parameter identifies an IDP device that the generator of the assertion trusts. In the illustrative example of FIG. 4, the assertion is generated by the IDP device 104B and indicates trust with the IDP device 104A. As a result, the trusted_issuer parameter provides the Uniform Resource Link (URL) of the IDP device 104A.

The example assertion pseudocode 402 includes a not before (nbf) parameter. A nbf parameter describes the time before which a JWT must not be accepted for processing. Conversely, the example assertion pseudocode 402 includes an expiration (exp) parameter. The exp parameter describes the time after which JWT must not be accepted for processing. As such, the example IDP device 104A can only embed the assertion into a token at example operation 3D if the timestamp of example operation 3C is both greater or equal to than the nbf parameter timestamp and less than or equal to the exp parameter timestamp.

The example assertion pseudocode 402 also includes a signature that is signed by the example IDP device 104B using a cryptographic algorithm. In the illustrative example of FIG. 4, the cryptographic algorithm is the Rivest-Shamir-Adleman (RSA) algorithm. In other examples, the IDP devices 104A, 104B uses a different cryptographic algorithm. The example IDP device 104B cryptographically signs the assertion at operation 3B so that the client device 106B can mathematically verify at operation 3F that the received assertion was actually generated by a trusted source.

The example token pseudocode 404 represents describes information that may be transmitted by the IDP device 104A to the client device 106A at example operation 3D. The example token pseudocode 404 includes a token_issuer parameter. In the token_issuer parameter, the example IDP device 104A provides its own URL so that the target recipient of the token (e.g., the client device 106B) can identify which device minted the token.

The example token pseudocode 404 also includes a friend_issuer data structure. While the illustrative example of FIGS. 4, 5 only show one trust link 112 and one friend_issuer data structure for simplicity, a given IDP device 104A may possess a plurality of trust links to other IDP devices and insert a corresponding plurality of friend_issuer data structures in the token.

The example friend_issuer data structure includes an example issuer parameter and an example assertion parameter. The example issuer parameter identifies a friend IDP that has provided an assertion. In the illustrative example of FIG. 4, the issuer parameter identifies the URL of the IDP device 104B. The example assertion parameter refers to the actual data represented by the example assertion pseudocode 402 and provided by a friend IDP. In the illustrative example of FIG. 4, the assertion is a signed file that shows the example IDP device 104B trust the example IDP device 104A.

The example token pseudocode 404 also includes a signature that is signed by the example IDP device 104B using a cryptographic algorithm (e.g., the RSA algorithm). The example IDP device 104A cryptographically signs the token at operation 3D so that the client device 106B can mathematically verify at operation 3F that the received token is actually minted by a trusted source (i.e., the IDP device 104A).

Figure 5:
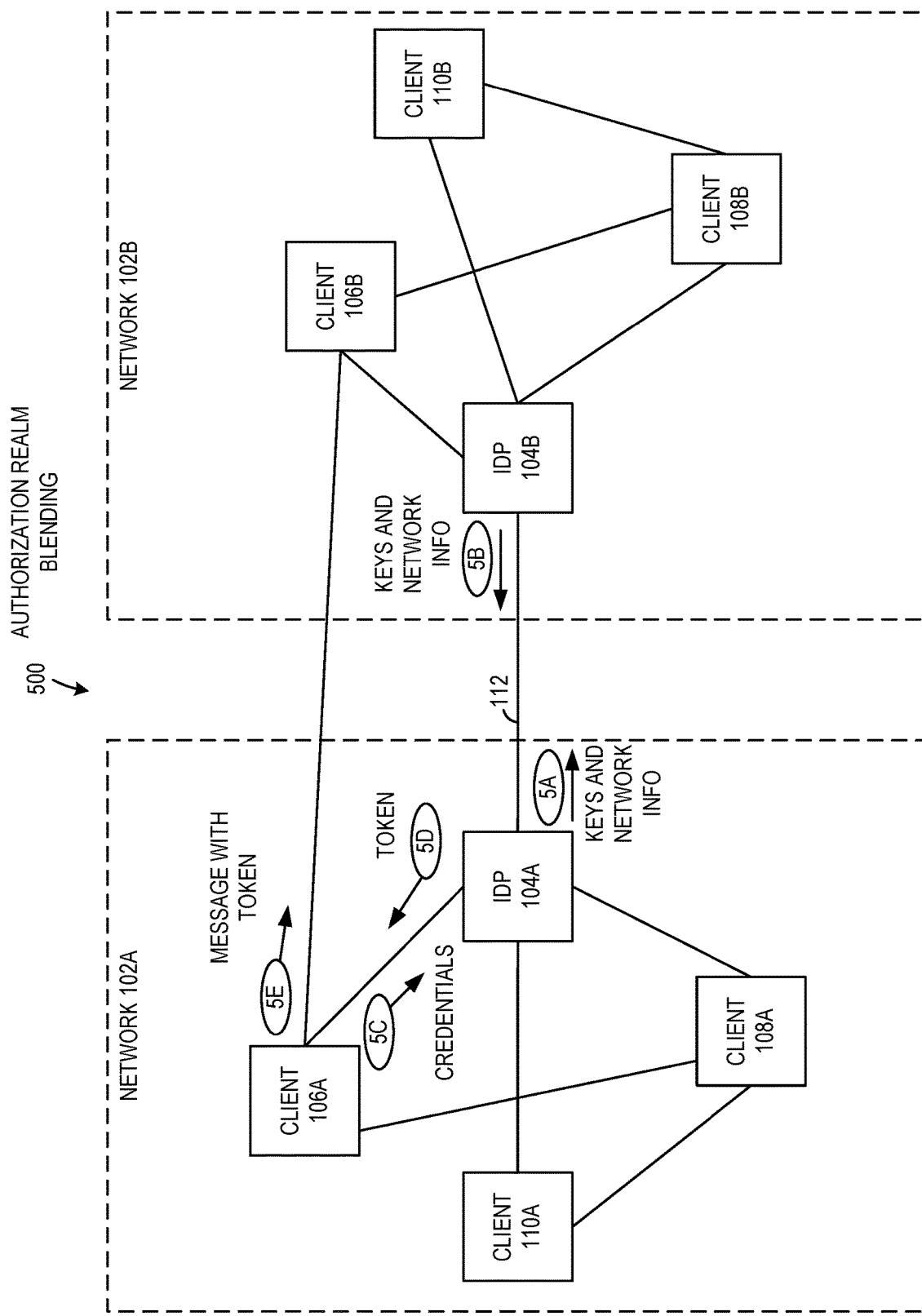
FIG. 5 is an illustrative example of authorization realm blending in the networks of FIG. 1.

FIG. 5 is an illustrative example of authorization realm blending in the networks of FIG. 1. FIG. 5 shows the example authorization realm blending system 500, which includes the example networks 102A, 102B. The example network 102A includes an example IDP device 104A and example client devices 106A, 108A, 110A. Similarly, the example network 102B includes an example IDP device 104B and example client devices 106B, 108B, 110B. The example IDP devices 104A, 104B are connected by the example trust link 112. The example diagram of FIG. 5 illustrates example operations 5A, 5B, 5C, 5D, 5E.

At the beginning of the illustrative example of FIG. 5, trust between the example networks 102A, 102B has not yet been established. To establish the example trust link 112 using authorization realm blending, the example IDP devices 104A, 104B may receive one another's IP address and use the address to engage in an authorization procedure as described previously.

At example operations 5A, 5B, the IDP devices 104A, 104B exchange signing keys with one another. As discussed previously in connection with FIG. 4, signing a token may involves the execution of a cryptographic algorithm. A signing key refers to an amount of data that is used as input to the cryptographic algorithm. In some examples, a signing key includes a private key.

At example operation 5A, the example IDP device 104A provides network information for network 102A to the example IDP device 104B. In general, network information describes which client devices exist in a network and the capabilities of said client devices. Network information may include, but is not limited to, descriptions of the amount and the type of compute resources and client devices within the network, the location of the client devices, policy information used to provide identities and capabilities for client devices, etc. Similarly, at example operation 5B, the example IDP device 104B provides network information for the network 102B to example IDP device 104A.

The example operations 5A may occur over any amount of time and with any amount of network description information. In some examples, the example IDP device 104A uses a cache to quickly transmit a large amount of network information to IDP device 104B over a short period of time. Additionally or alternatively, the example IDP devices 104A transmit specific pieces of information at irregular intervals over a large amount of time at example operation 5A. The one or more organizations managing the IDP device 104A may determine when and how to share network information based on business needs, available compute resources, etc. Similarly, the example operation 5B may occur over any amount of time and with any amount of network description information.

After operations 5A and 5B are complete, the example client device 106A identifies and forms a message to provide to the example client device 106B. The client device 106A may attempt to communicate with the example client device 106B at any time during which (a) the trust link 112 is established and (b) both IDP devices 104A, 104B have shared signing keys and network description information.

At example operation 5C, the client device 106A sends credentials and audience data to the IDP device 104A. Upon receiving the credentials and audience data, the example IDP device 104A generates a token at example operation 5D using the signing keys from example IDP device 104B. By using the signing keys of a friend IDP, an IDP device can mint a token that appears as if it was minted by the friend IDP. Additionally, the example IDP device 104A provides the token to the example client device 106A at operation 5D.

At example operation 5E, the example client device 106A provides the message and the token to the example client device 106B. The example client device 106B may then execute a decryption algorithm to identify that the token was signed with keys corresponding to the IDP device 104B. As a result, the example client device 106B interprets the token from client device 106A as minted by IDP device 104B. Similarly, the example client device 106B would interpret any token from a client device 108B, 110B within the network 102B as minted by IDP device 104B. Based on the signing keys corresponding to IDP device 104B, the example client device 106B may respond to the message from the client device 106A, perform operations based on the message, etc.

The example authorization realm blending system 500 allows the IDP devices 104A, 104B to operate as identical instances of one another by exchanging large amount of data. Such a configuration removes a need for client devices 106A, 108A, 110A to connect to the IDP device 104B of another network seen in previous approaches, as the example IDP device 104A may provide the same functionality as IDP device 104B, and vice versa, in an authorization realm blending technique. As such, authorization realm blending enables increased scaling of networks when compared to previous approaches. Additionally, authorization realm blending does not require reconfiguration of client devices, which reduces complexity of sharing trust when compared to previous approaches. Furthermore, the example authorization realm blending system 500 minimizes the latency of establishing trust between client devices across networks, because a first IDP device can mint tokens that appear to be minted from a friend IDP.

In some examples, sharing signing keys and network information as described in authorization realm blending increases the risk of compromising the example authorization realm blending system 500. For example, if the example IDP devices 104A, 104B share enough information to operate as identical instances, then example IDP device 104B may become inherently compromised if the example IDP device 104A were to become directly compromised by a malicious actor. An organization may choose whether to implement an example RTM system 200, example DTIT system 300, or example authorization realm blending system 500 to share trust based on factors that may include, but are not limited to, a desired scale of the merged networks, an accepted amount of latency when establishing trust, an amount of resources available to reconfigure devices, the strength of the network security, the type of information exchanged on the networks, the type of operations performed on the network, etc.

Figure 6:
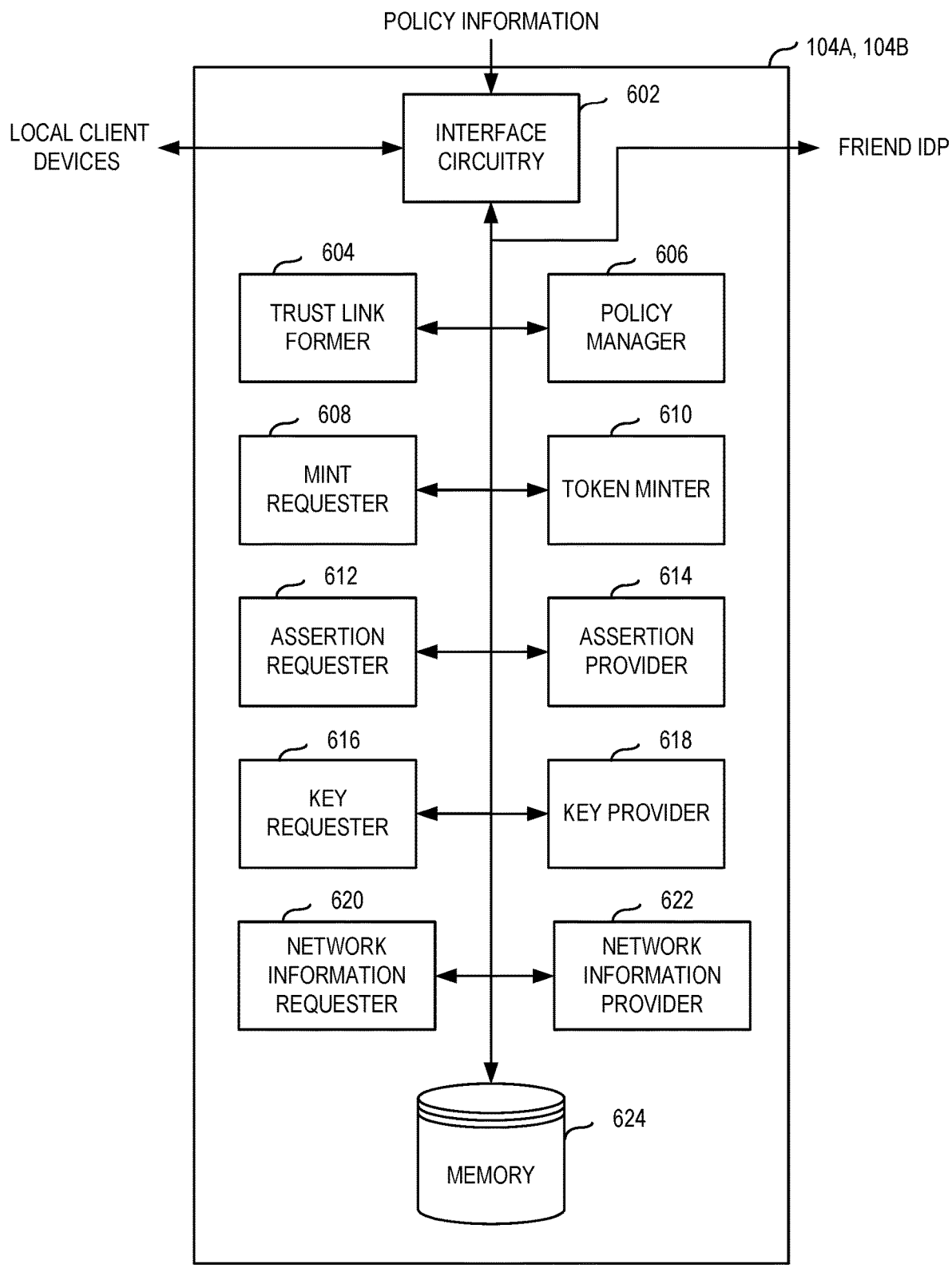
FIG. 6 is an example block diagram of an Identity Provider (IDP) device of FIG. 1.

FIG. 6 is a block diagram of the example IDP devices 104A, 104B to share trust. That is, the example block diagram of FIG. 6 may be used to implement one or both of the example IDP devices 104A, 104B. For simplicity, the description of FIG. 6 provided herein is only in reference to the example IDP device 104A. However, the description of FIG. 6 can alternatively refer to the example IDP device 104B, or to any other IDP device implemented according to the teachings of this disclosure.

The example IDP devices 104A of FIG. 6 may be instantiated (e.g., created an instance of, brought into being for any length of time, materialized, implemented, etc.) by processor circuitry such as a central processing unit executing instructions. Additionally or alternatively, the example IDP device 104A of FIG. 6 may be instantiated (e.g., created an instance of, brought into being for any length of time, materialized, implemented, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 is implemented by microprocessor circuitry executing instructions to implement one or more virtual machines and/or containers. The example IDP device 104A includes example interface circuitry 602, example trust link former circuitry 604, example policy manager circuitry 606, example mint requester circuitry 608, example token minter circuitry 610, example assertion requester circuitry 612, example assertion provider circuitry 614, example key requester circuitry 616, example key provider circuitry 618, example network information requester circuitry 620, example network information provider circuitry 622, and example memory 624.

The example interface circuitry 602 exchanges data between the example IDP device 104A and other compute devices. For example, the interface circuitry 602 may communicate with the example client devices 106A, 108A, 110A to obtain credentials, provide tokens, etc. The interface circuitry 602 may also communicate with the IDP device 104B to establish a trust link, provide a mint request, exchange assertions, keys, and/or network information, etc. The example interface circuitry 602 may determine which information to send to which device based on instructions from other components within the example IDP device 104A. The example interface circuitry 602 may be implemented by any type of transceiver circuitry.

The example interface circuitry 602 may also obtain policy information. As used herein, policy information refers to any instructions that the example IDP device 104A may use to manage the network. Policy information may include, but is not limited to, which authorization realm to merge with, when to establish a trust link 112, which trust sharing technique (i.e., the example RTM system 200, example DTIT system 300, and the example authorization realm blending system 500) to employ during a merge, how to determine the scope of trust for a given client device in the network, when to terminate trust, what information can be shared with friend IDPs, etc. The example interface circuitry 602 may obtain policy information from any source. In some examples, policy information is determined by one or more organizations managing the IDP device. In some examples, some policy information is pre-determined by a manufacturer and stored in the example memory 624. In some examples, the interface circuitry 602 is instantiated by processor circuitry executing interface instructions and/or configured to perform operations such as those represented by the flowcharts of FIGS. 7-10.

The example trust link former circuitry 604 establishes the example trust link 112 with the example IDP device 104A. To establish the trust link 112, the example trust link former circuitry 604 may identify, deploy an authorization procedure, and determine a shared communication protocol with the IDP device 104B. In some examples, the trust link former circuitry 604 is instantiated by processor circuitry executing trust link former instructions and/or configured to perform operations such as those represented by the flowchart of FIG. 7.

The example policy manager circuitry 606 coordinates the components of the example IDP device 104A based on the policy information. For example, suppose interface circuitry 602 receives instructions from a source that instructs the network 102A to merge with network 102B. After obtaining the instructions from the interface circuitry 602, the example policy manager circuitry 606 may obtain an IP address of the IDP device 104B, provide the IP address to the trust link former circuitry 604, and instruct the example trust link former to establish a trust link using the IP address. In such examples, the example policy manager circuitry 606 additionally attempts to access the example memory 624 to determine which trust sharing system to use. If no such information exists within the example memory 624, the example policy manager circuitry 606 may send a request for trust sharing instructions to the interface circuitry 602, which forwards the request to the source of the merger instruction. Once trust sharing instructions are obtained, the example policy manager circuitry 606 may further determine whether to: (a) wait for credentials from a client device, (b) send instructions to the assertion requester circuitry 612 and assertion provider circuitry 614, or (c) send instructions to the key requester circuitry 616 and key provider circuitry 618. The example policy manager circuitry 606 may make the determination based on whether the instructions indicate the example RTM system 200, the example DTIT system 300, or the example authorization realm blending system 500 should be implemented. In some examples, the policy manager circuitry 606 is instantiated by processor circuitry executing policy manager instructions and/or configured to perform operations such as those represented by the flowcharts of FIGS. 7-10.

The example mint requester circuitry 608 of the IDP device 104A causes the example token minter circuitry 610 of the IDP device 104B to mint a token. To cause a friend IDP device to mint a token, the mint requester circuitry may provide the credentials, a description of the transmitter device and a description of the audience device to the IDP device 104B via the interface circuitry 602. Alternatively, the mint requester circuitry 608 may provide an assertion and/or a one time password to the client device 106A via the interface circuitry 602 and instruct the client device 106A to contact the example IDP device 104B directly. The example mint requester circuitry 608 causes the example token minter circuitry 610 of the IDP device 104B based on instructions from the policy manager circuitry 606, which may be provided when the RTM system 200 is employed and credentials are received from the client device 106A. In some examples, the mint requester circuitry 608 instructs the interface circuitry 602 to communicate with the IDP device 104B by executing an API call.

The example token minter circuitry 610 of the IDP device 104A mints tokens that represent an authorization for a transmitter device to contact a receiver device. In some examples, the example token minter circuitry 610 mints tokens in response to a mint request from the IDP device 104B. In other examples, the example token minter circuitry 610 additionally mints a toke in response to a mint request from one of the client devices 106B, 108B, 110B, provided an assertion or OTP is provided with the mint request. In other examples, the example token minter circuitry 610 mints a token in response to receiving credentials from a client device 106A, 108A, 110A. In some examples, the example token minter circuitry 610 embeds assertion data into the token.

The example token minter circuitry 610 determines when to mint a token and what data should be in a token based on instructions from the policy manager circuitry 606 and the selected trust sharing system. In some examples, the token minter circuitry 610 is instantiated by processor circuitry executing token minter instructions and/or configured to perform operations such as those represented by the flowchart of FIGS. 8-10.

The example assertion requester circuitry 612 of the IDP device 104A requests assertion data from the IDP device 104B via the interface circuitry 602. In some examples, the example assertion requester circuitry 612 requests assertion data repeatedly at regular intervals. The example assertion requester circuitry 612 determines when to request assertion data based on instructions from the policy manager circuitry 606 and the selected trust sharing system. The assertion requester circuitry 612 may instruct the interface circuitry 602 to communicate with the IDP device 104B by executing an API call. In some examples, the assertion requester circuitry 612 is instantiated by processor circuitry executing assertion requester instructions and/or configured to perform operations such as those represented by the flowchart of FIG. 9.

The example assertion provider circuitry 614 of the IDP device 104A provides an assertion to the example IDP device 104B. The assertion may include the information described previously in FIG. 4. example assertion provider circuitry 614 of the IDP device 104A may provide an assertion based on receipt of an assertion request from the IDP device 104B and instructions from the policy manager circuitry 606. The assertion provider circuitry 614 may instruct the interface circuitry 602 to communicate with the IDP device 104B by executing an API call. In some examples, the assertion provider circuitry 614 is instantiated by processor circuitry executing assertion provider instructions and/or configured to perform operations such as those represented by the flowchart of FIG. 9.

The example key requester circuitry 616 of the IDP device 104A requests signing keys from the example IDP device 104B. The received signing keys may be used by the example token minter circuitry 610 to mint tokens that appear to have been created by the example IDP device 104B. The example key requester circuitry 616 of the IDP device 104A may request keys based on instructions from the policy manager circuitry 606 and the selected trust sharing system. The key requester circuitry 616 may instruct the interface circuitry 602 to communicate with the IDP device 104B by executing an API call. In some examples, the key requester circuitry 616 is instantiated by processor circuitry executing key requester instructions and/or configured to perform operations such as those represented by the flowchart of FIG. 10.

The example key provider circuitry 618 of the IDP device 104A provides signing keys to the example IDP device 104B. The signing keys may be used by the example token minter circuitry 610 of the example IDP device 104B to mint tokens that appear to have been created by the example IDP device 104A. The example key provider circuitry 618 of the IDP device 104A may provide keys based on instructions from the policy manager circuitry 606 and the selected trust sharing system. The key provider circuitry 618 may instruct the interface circuitry 602 to communicate with the IDP device 104B by executing an API call. In some examples, the key provider circuitry 618 is instantiated by processor circuitry executing key providers instructions and/or configured to perform operations such as those represented by the flowchart of FIG. 10.

The example network information requester circuitry 620 of the IDP device 104A requests network information from the example IDP device 104B. When implemented within the authorization realm blending system 500, the network information is used by the token minter circuitry 610 to determine when a token should be minted. For example, suppose the network information provided to IDP device 104A describes that client device 106B includes resource A and resource B. The network information further provides that client device 106B only allows client devices from other networks to access resource A. In such a hypothetical, the IDP device 104A would require any client device that requests a token to communicate with client device 106B to specify which resource the client device wants access to. Therefore, if the client device 106A requests access to resource B from client device 106B at operation 5C, the IDP device 104A would use the network information to determine that such access is not permitted. As a result, the IDP device 104A would not mint the token at operation 5D.

The example network information requester circuitry 620 of the IDP device 104A may determine when to request network information, the type of information to request, and the amount of information to request based on instructions from the policy manager circuitry 606 and the selected trust sharing system. The network information requester circuitry 620 may instruct the interface circuitry 602 to communicate with the IDP device 104B by executing an API call. In some examples, the network information requester circuitry 620 is instantiated by processor circuitry executing network information requester instructions and/or configured to perform operations such as those represented by the flowchart of FIG. 10.

The example network information provider circuitry 622 of the IDP device 104A provides network information to the example IDP device 104B. The example network information requester circuitry 620 of the IDP device 104A may determine when to request network information, the type of information to request, and the amount of information to request based on instructions from the policy manager circuitry 606 and the selected trust sharing system. The network information requester circuitry 620 may instruct the interface circuitry 602 to communicate with the IDP device 104B by executing an API call. In some examples, the network information provider circuitry 622 is instantiated by processor circuitry executing network information provider instructions and/or configured to perform operations such as those represented by the flowchart of FIG. 10.

The example memory 624 stores data used by the example IDP device 104A to manage the network 102A. Example data stored in the memory 624 may include, but is not limited to, policy information, the identities and roles of client devices, the compute resources available to each client device, a list of which client devices trust each other, public and private keys, a cache for API and cryptographic function execution, etc.

The example memory 624 may be implemented as any type of memory. For example, the example memory 624 may be a volatile memory or a non-volatile memory. The volatile memory may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory may be implemented by flash memory and/or any other desired type of memory device.

In some examples, the example IDP device 104A includes means for communicating. For example, the means for communicating may be implemented by interface circuitry 602. In some examples, the interface circuitry 602 may be instantiated by processor circuitry such as the example processor circuitry 1112 of FIG. 11. For instance, the interface circuitry 602 may be instantiated by the example microprocessor 1200 of FIG. 12 executing machine executable instructions such as those implemented by at least blocks 802, 810, 904, 914, 1004, 1008 of FIGS. 8, 9, 10. In some examples, the interface circuitry 602 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the interface circuitry 602 may be instantiated by any other combination of hardware, software, and/or firmware. For example, the interface circuitry 602 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for forming trust. For example, the means for forming trust may be implemented by trust link former circuitry 604. In some examples, the trust link former circuitry 604 may be instantiated by processor circuitry such as the example processor circuitry 1112 of FIG. 11. For instance, the trust link former circuitry 604 may be instantiated by the example microprocessor 1200 of FIG. 12 executing machine executable instructions such as those implemented by at least blocks 702-708 of FIG. 7. In some examples, the trust link former circuitry 604 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the trust link former circuitry 604 may be instantiated by any other combination of hardware, software, and/or firmware. For example, the trust link former circuitry 604 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for causing an IDP device to mint a token. For example, the means for causing an IDP device to mint a token may be implemented by mint requester circuitry 608. In some examples, the mint requester circuitry 608 may be instantiated by processor circuitry such as the example processor circuitry 1112 of FIG. 11. For instance, the mint requester circuitry 608 may be instantiated by the example microprocessor 1200 of FIG. 12 executing machine executable instructions such as those implemented by at least blocks 804 of FIG. 8. In some examples, the mint requester circuitry 608 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the mint requester circuitry 608 may be instantiated by any other combination of hardware, software, and/or firmware. For example, the mint requester circuitry 608 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for minting a token. For example, the means for minting a token may be implemented by token minter circuitry 610. In some examples, the token minter circuitry 610 may be instantiated by processor circuitry such as the example processor circuitry 1112 of FIG. 11. For instance, the token minter circuitry 610 may be instantiated by the example microprocessor 1200 of FIG. 12 executing machine executable instructions such as those implemented by at least blocks 806, 912, 1006 of FIGS. 8, 9, 10. In some examples, token minter circuitry 610 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the token minter circuitry 610 may be instantiated by any other combination of hardware, software, and/or firmware. For example, the token minter circuitry 610 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for requesting an assertion. For example, the means for requesting an assertion may be implemented by assertion requester circuitry 612. In some examples, the assertion requester circuitry 612 may be instantiated by processor circuitry such as the example processor circuitry 1112 of FIG. 11. For instance, the assertion requester circuitry 612 may be instantiated by the example microprocessor 1200 of FIG. 12 executing machine executable instructions such as those implemented by at least blocks 902, 908 of FIG. 9. In some examples, the assertion requester circuitry 612 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the assertion requester circuitry 612 may be instantiated by any other combination of hardware, software, and/or firmware. For example, the assertion requester circuitry 612 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for providing an assertion. For example, the means for providing an assertion may be implemented by assertion provider circuitry 614. In some examples, the assertion provider circuitry 614 may be instantiated by processor circuitry such as the example processor circuitry 1112 of FIG. 11. For instance, the assertion provider circuitry 614 may be instantiated by the example microprocessor 1200 of FIG. 12 executing machine executable instructions such as those implemented by at least blocks 902 of FIG. 9. In some examples, the assertion provider circuitry 614 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the assertion provider circuitry 614 may be instantiated by any other combination of hardware, software, and/or firmware. For example, the assertion provider circuitry 614 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for requesting signing keys. For example, the means for requesting signing keys may be implemented by key requester circuitry 616. In some examples, the key requester circuitry 616 may be instantiated by processor circuitry such as the example processor circuitry 1112 of FIG. 11. For instance, the key requester circuitry 616 may be instantiated by the example microprocessor 1200 of FIG. 12 executing machine executable instructions such as those implemented by at least blocks 1002 of FIG. 10. In some examples, the key requester circuitry 616 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the key requester circuitry 616 may be instantiated by any other combination of hardware, software, and/or firmware. For example, the key requester circuitry 616 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for providing signing keys. For example, the means for providing signing keys may be implemented by key provider circuitry 618. In some examples, the key provider circuitry 618 may be instantiated by processor circuitry such as the example processor circuitry 1112 of FIG. 11. For instance, the key provider circuitry 618 may be instantiated by the example microprocessor 1200 of FIG. 12 executing machine executable instructions such as those implemented by at least blocks 1002 of FIG. 10. In some examples, the key provider circuitry 618 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the key provider circuitry 618 may be instantiated by any other combination of hardware, software, and/or firmware. For example, the key provider circuitry 618 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for requesting network information. For example, the means for requesting network information may be implemented by network information requester circuitry 620. In some examples, the network information requester circuitry 620 may be instantiated by processor circuitry such as the example processor circuitry 1112 of FIG. 11. For instance, the network information requester circuitry 620 may be instantiated by the example microprocessor 1200 of FIG. 12 executing machine executable instructions such as those implemented by at least blocks 1003 of FIG. 10. In some examples, the network information requester circuitry 620 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the network information requester circuitry 620 may be instantiated by any other combination of hardware, software, and/or firmware. For example, the network information requester circuitry 620 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the example IDP device 104A includes means for providing network information. For example, the means for providing network information may be implemented by network information provider circuitry 622. In some examples, the network information provider circuitry 622 may be instantiated by processor circuitry such as the example processor circuitry 1112 of FIG. 11. For instance, the network information provider circuitry 622 may be instantiated by the example microprocessor 1200 of FIG. 12 executing machine executable instructions such as those implemented by at least blocks 1003 of FIG. 10. In some examples, the network information provider circuitry 622 may be instantiated by hardware logic circuitry, which may be implemented by an ASIC, XPU, or the FPGA circuitry 1300 of FIG. 13 structured to perform operations corresponding to the machine-readable instructions. Additionally or alternatively, the network information provider circuitry 622 may be instantiated by any other combination of hardware, software, and/or firmware. For example, the network information provider circuitry 622 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

While an example manner of implementing the IDP device 104A of FIG. 1 is illustrated in FIG. 6, one or more of the elements, processes, and/or devices illustrated in FIG. 6 may be combined, divided, re-arranged, omitted, eliminated, and/or implemented in any other way. Further, the example trust link former circuitry 604, example policy manager circuitry 606, example mint requester circuitry 608, example token minter circuitry 610, example assertion requester circuitry 612, example assertion provider circuitry 614, example key requester circuitry 616, example key provider circuitry 618, example network information requester circuitry 620, example network information provider circuitry 622, and/or, more generally, the example IDP device 104A of FIG. 1, may be implemented by hardware alone or by hardware in combination with software and/or firmware. Thus, for example, any of the example trust link former circuitry 604, example policy manager circuitry 606, example mint requester circuitry 608, example token minter circuitry 610, example assertion requester circuitry 612, example assertion provider circuitry 614, example key requester circuitry 616, example key provider circuitry 618, example network information requester circuitry 620, example network information provider circuitry 622, and/or, more generally, the example IDP device 104A could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example IDP device 104A of FIG. 1 may include one or more elements, processes, and/or devices in addition to, or instead of, those illustrated in FIG. 6, and/or may include more than one of any or all of the illustrated elements, processes and devices.

A flowchart representative of example machine-readable instructions, which may be executed to configure processor circuitry to implement the example IDP device 104A of FIG. 6, is shown in FIGS. 7-10. The machine-readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 7-10, many other methods of implementing the example IDP device 104A may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7-10 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine-readable medium, and non-transitory machine-readable storage medium are expressly defined to include any type of computer readable storage device and/or storage disk and to exclude propagating signals and to exclude transmission media. As used herein, the terms "computer readable storage device" and "machine-readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or operations, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or operations, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
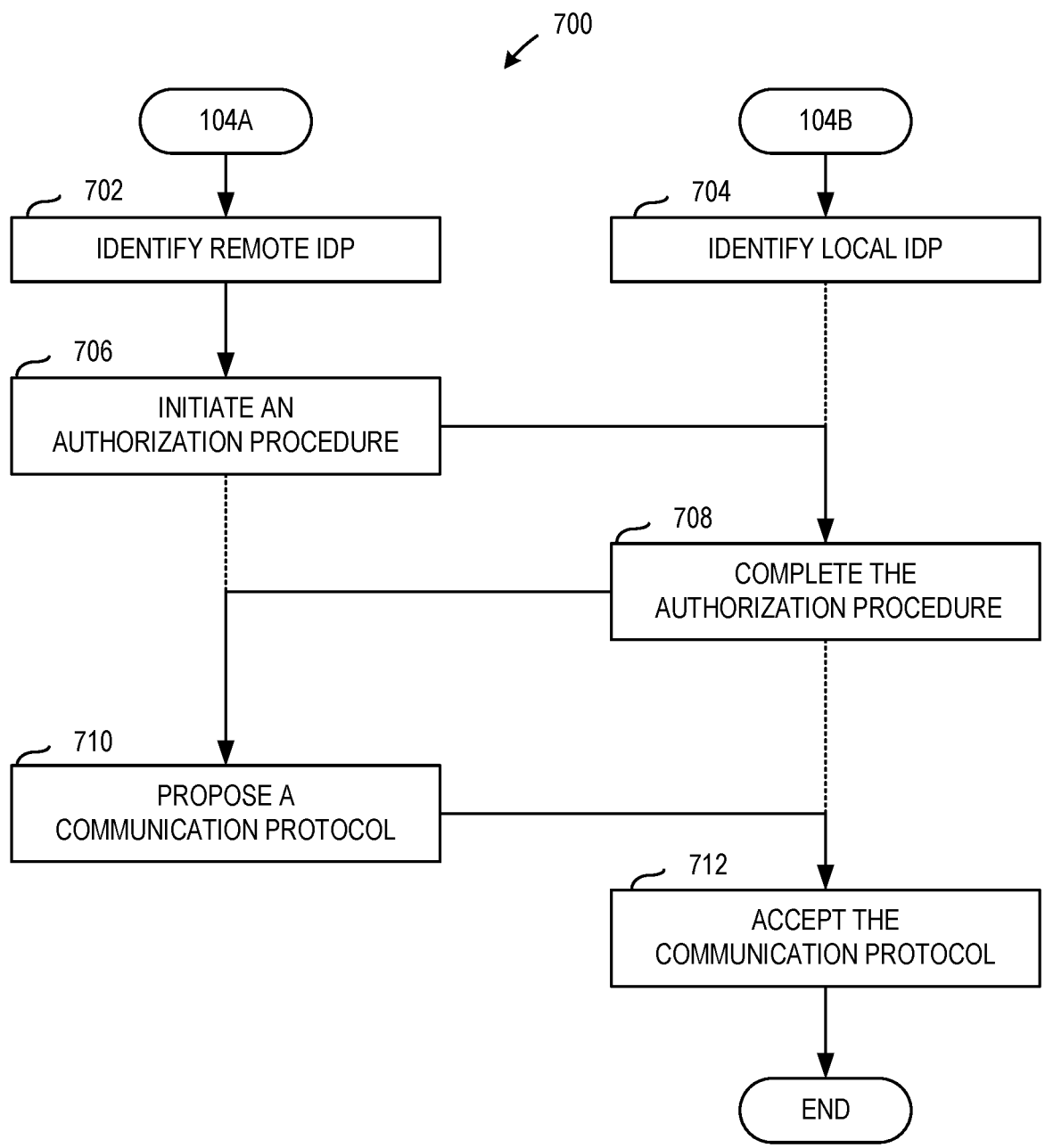
FIG. 7 is a flowchart representative of example machine-readable instructions and/or example operations that may be executed by example processor circuitry to establish the trust link of FIG. 1.

FIG. 7 is a flowchart representative of example machine-readable instructions and/or example operations 700 that may be executed and/or instantiated by processor circuitry to establish a trust link. The flowchart of FIG. 7 is organized in two columns labelled "104A" and "104B". Accordingly, operations positioned within the "104A" column are implemented by the example IDP device 104A and operations positioned within the "104B" column are implemented by the example IDP device 104B. In the flowchart of FIG. 7, example IDP device 104A is labelled as "local IDP" and example IDP device 104B is labelled as "remote IDP". In other examples, the IDP device 104B is referred to as a local device and the IDP device 104A is referred to as a remote device.

In some examples, the machine-readable instructions and/or the operations 700 of FIG. 7 begin when the IDP device 104A identifies the IDP device 104B. (Block 702). The IDP device 104A may identify the IDP device 104B using an IP address and/or URL as described previously. In some examples, the IP address or URL of the IDP device 104B is provided to the IDP device 104A by an organization managing the merge of authorization realms.

In other examples, the machine-readable instructions and/or the operations 700 of FIG. 7 begin when the IDP device 104B identifies the IDP device 104A. (Block 704). The IDP device 104A may identify the IDP device 104B using an IP address and/or URL as described previously. In some examples, the IP address or URL of the IDP device 104B is provided to the IDP device 104A by an organization managing the merge of authorization realms.

After both IDP devices 104A, 104B have identified the other IDP, the example IDP device 104A initiates an authorization procedure with the IDP device 104B. (Block 706). Initiating an authorization procedure may include the performance of operations such as providing a digital certificate, providing a public key, beginning a handshake protocol, etc. Following the initiation, the example IDP device 104B completes the authorization procedure. (Block 708). Completing an authorization procedure may include the performance of operations such as verifying a received digital certificate, providing an additional digital certificate, providing a public key, responding to a handshake protocol, etc.

The example flowchart of FIG. 7 illustrates the IDP device 104A initiating the authorization procedure and the IDP device 104B completing the authorization procedure. In other examples, the IDP device 104B initiates the authorization procedure and the IDP device 104B completes the authorization procedure. In some examples, completing an authorization procedure includes multiple data transmissions between the IDP devices 104A, 104B.

The IDP device 104A proposes a communication protocol with the example IDP device 104B. (Block 710). Following the proposal, the example IDP device 104B accepts the communication protocol. (Block 712). For example, the IDP devices 104A, 104B may both implement a shared API that includes common request and response functions. In some examples, the shared API includes function calls to request an assertion, generate an assertion, request a key, provide a key, request a token be minted, provide a token, request network information, provide network information, etc. In some examples, the request network information API call includes arguments that describe the type and an amount of network information that is requested. In other examples, IDP device 104A proposes and IDP device 104B accepts a communication protocol other than an API.

The example trust link 112 is considered established and the example machine-readable instructions and/or operations 700 end after block 708.

Figure 8:
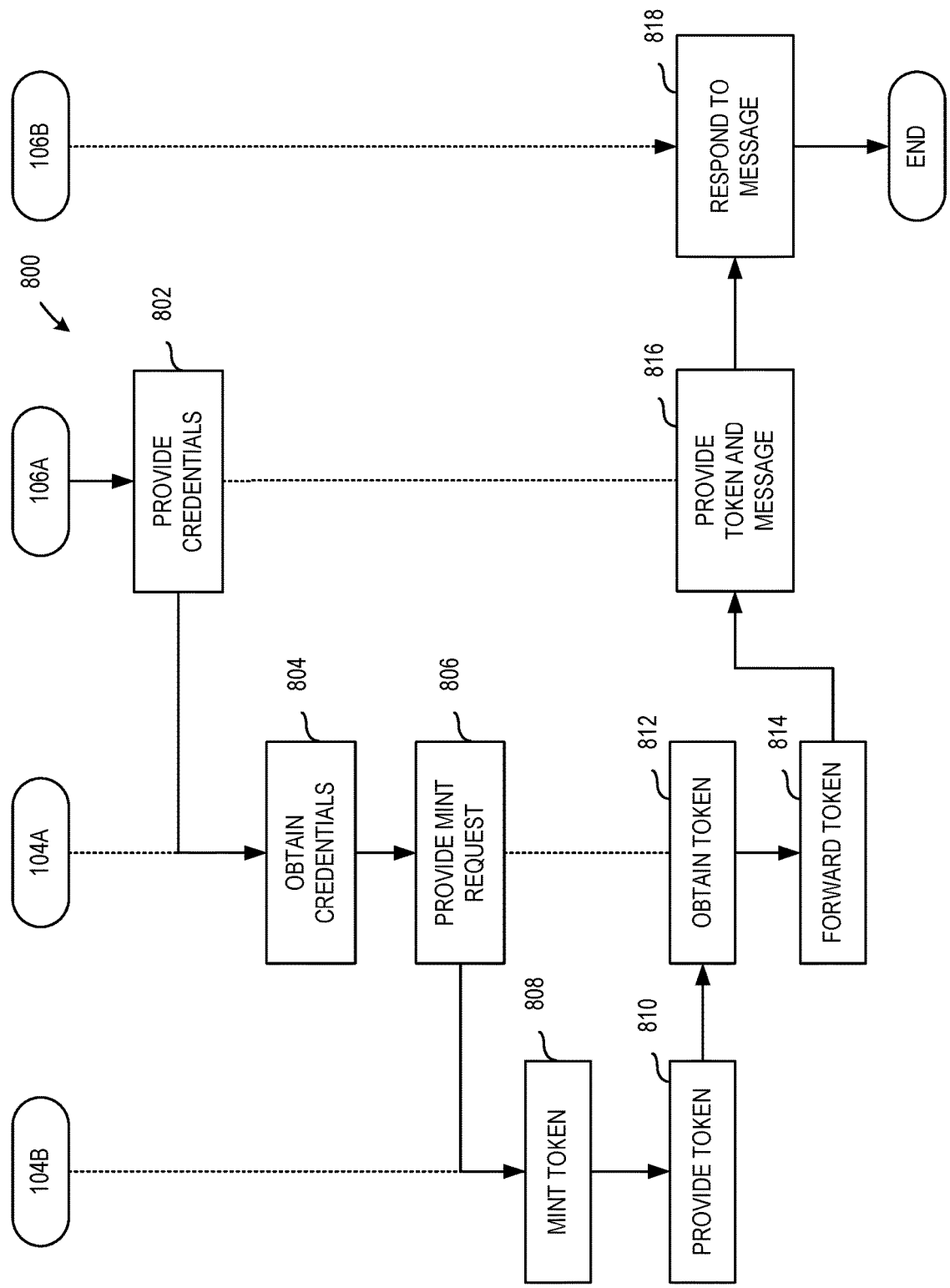
FIG. 8 is a flowchart representative of example machine-readable instructions and/or example operations that may be executed by example processor circuitry to implement the Remote Token Minting of FIG. 2.

FIG. 8 is a flowchart representative of example machine-readable instructions and/or example operations that may be executed by example processor circuitry to implement the RTM system 200 of FIG. 2. The example machine-readable instructions and/or operations 800 may be implemented after the example trust link 112 has been established as described in FIG. 7. The flowchart of FIG. 8 is organized in four columns labelled "104B", "104A", "106A", and "106B". Accordingly, operations positioned within the "104B" column are implemented by the example IDP device 104B, operations positioned within the "104A" column are implemented by the example IDP device 104A, operations positioned within the "106A" column are implemented by the example client device 106A, and operations positioned within the "106B" column are implemented by the example client device 106B.

The example machine-readable instructions and/or operations 800 begin when the client device 106A provides credentials to the IDP device 104A. (Block 802). The example client device 106A provides the credentials to initiate transmission of a message to the client device 106B.

The example IDP device 104A obtains the credentials from the client device 106A. (Block 804). The example IDP device 104A then provides a mint request to the example IDP device 104B. (Block 806). The example mint request may include a description of the transmitter device and the audience device as described in example operation 2B. In other examples, the IDP device 104A provides an assertion or an OTP to the client device 106A at block 806 and instructs the client device 106A to contact the example IDP device 104B directly.

The example IDP device 104B mints a token based on the mint request. (Block 808). The token provides authorization from the example IDP device 104B for the client device 106B to interact with the message from the local client device 106A. In some examples, the IDP device 104B validates the mint request before minting the token as described previously.

The example IDP device 104A obtains the token from the example IDP device 104B. (Bock 812). The example IDP device 104A then forwards the token to the client device 106A. (Block 814).

After receiving the token, the client device 106A provides both the token and the message to the client device 106B. (Block 816). The example client device 106B responds to the message (Block 818) upon receipt because the corresponding token is minted by a trusted source, the IDP device 104B. The example client device 106B may additionally or alternatively perform operations based on the message at block 818. The example machine-readable instructions and/or operations 800 end after block 818.

Figure 9:
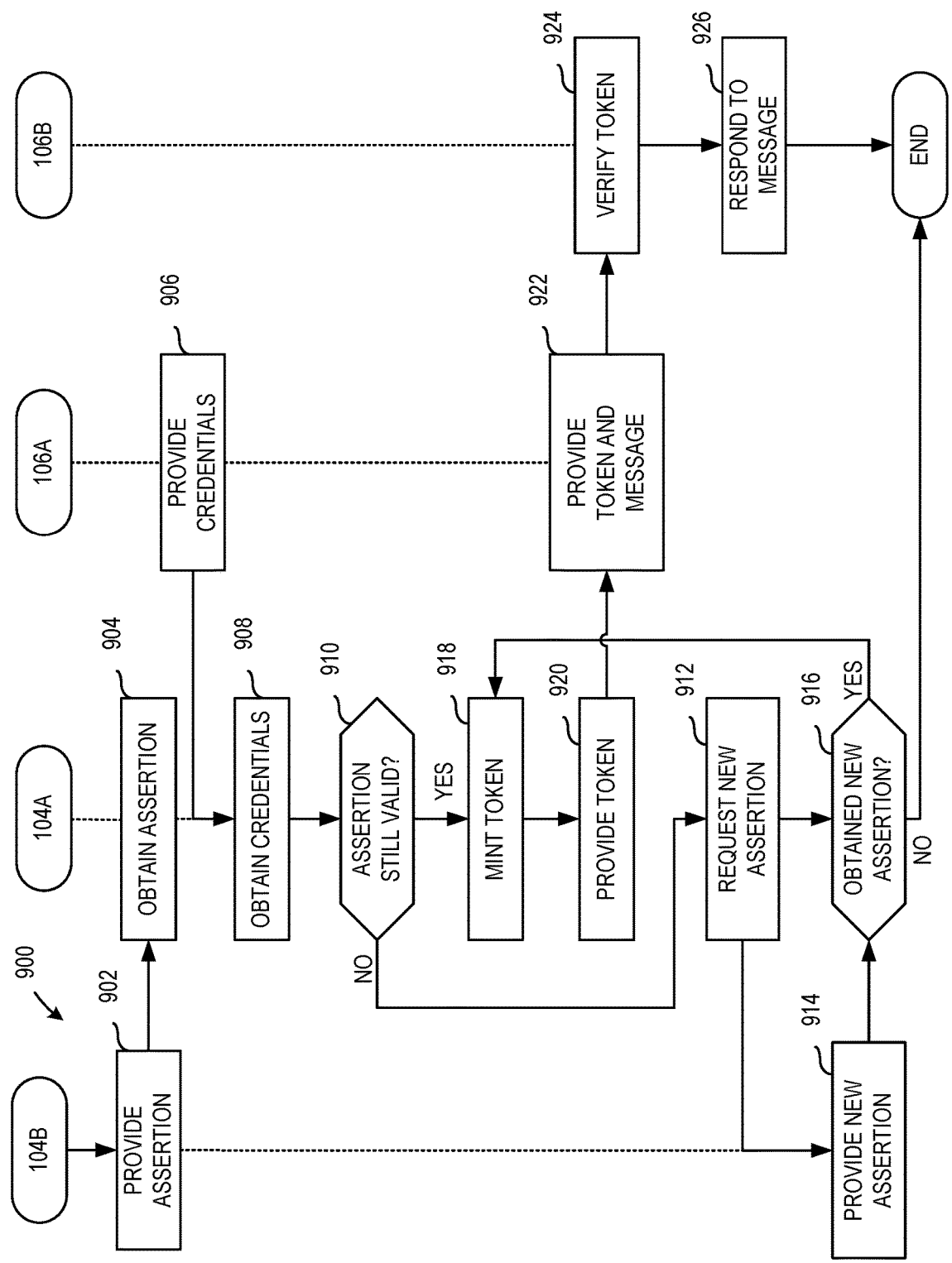
FIG. 9 is a flowchart representative of example machine-readable instructions and/or example operations that may be executed by example processor circuitry to implement DTIT as described in FIG. 3.

FIG. 9 is a flowchart representative of example machine-readable instructions and/or example operations that may be executed by example processor circuitry to implement the example DTIT system 300 of FIG. 3. The example machine-readable instructions and/or operations 900 may be implemented after the example trust link 112 has been established as described in FIG. 7. The flowchart of FIG. 9 is organized in four columns labelled "104B", "104A", "106A", and "106B". Accordingly, operations positioned within the "104B" column are implemented by the example IDP device 104B, operations positioned within the "104A" column are implemented by the example IDP device 104A, operations positioned within the "106A" column are implemented by the example client device 106A, and operations positioned within the "106B" column are implemented by the example client device 106B.

The example machine-readable instructions and/or operations 900 of FIG. 9 begin when the example IDP device 104B provides an assertion to the IDP device 104A. (Block 902). An assertion refers to data that signifies an IDP device trusts a friend IDP. As described previously in FIG. 4, the example assertion may also include data that describes a range of time in which the assertion is valid and unexpired. In some examples, the machine-readable instructions and/or operations 900 implement block 902 periodically (i.e., the IDP device 104B repeatedly transmits assertions to the IDP device 104A at regular intervals). In some examples, the example IDP device 104A additionally provides an assertion to the example IDP device 104B.

The example IDP device 104A obtains the assertion from the IDP device 104B. (Block 904). Later, the example local client device 106A provides credentials to the IDP device 104A (Block 906) to initiate transmission of a message to the client device 106B. The client device 106A may provide the credentials to the IDP device 104A at any time after the execution of block 904.

The example IDP device 104A obtains the credentials from the client device 106A. (Block 908). The example IDP device 104A then determines whether the assertion obtained at block 904 is still valid at the time the credentials are obtained at block 908. (Block 910). In some examples, the IDP device 104A determines whether the assertion is still valid by comparing a timestamp corresponding to when credentials were obtained with the nbf and exp parameter timestamps of FIG. 4. If the assertion is still valid (Block 906: Yes), the example machine-readable instructions and/or operations 900 proceed to block 918.

If the assertion is no longer valid (Block 910: No), the example IDP device 104A requests a new assertion from the IDP device 104B. (Block 912). Upon obtaining the request, the IDP device 104B provides a new assertion to IDP device 104A. (Block 914). In other examples, the IDP device 104B does not provide a new assertion request. In such examples, an organization managing the IDP device 104 may choose not to renew trust and share a new assertion for any reason.

The example IDP device 104A then determines whether if the new assertion has been obtained. (Block 916). In some examples, the shared protocol between friend IDPs indicates that the IDP device 104B should always send a response to the IDP device 104A, even if the response only indicates a new assertion will not be provided. In such examples, the IDP device 104A waits for a response and interpret the response at block 916. In other examples, the shared protocol between friend IDPs indicates the IDP device 104A should assume a new assertion will not be provided if a new assertion is not provided within a pre-defined period. In such examples, the IDP device 104A either obtains the new assertion or waits until the end of the pre-defined period at block 916. If a new assertion is not obtained (Block 916: No), the example IDP device 104B no longer trusts the IDP device 104A and, as a result, the example machine-readable instructions and/or operations 900 end without the client device 106A transmitting the message.

If a new assertion is obtained (Block 916: Yes), or if the original assertion was still valid when the credentials were obtained (block 910: Yes), the example IDP device 104A mints a token with the assertion from the IDP device 104B. (Block 918). The assertion may be appended to, embedded in, and/or generally attached to the token using any data structure and any format. The example IDP device 104A may additionally include a cryptographic signature within the minted token.

The example IDP device 104A provides the token with the assertion to the client device 106A. (Block 920). In turn, the client device 106A provides the token and the message to the client device 106B. (Block 922).

Upon receipt, the example client device 106B verifies the token. (Block 924). To verify the token, the example client device 106B extracts the assertion data from the token and executes a decryption algorithm to confirm the assertion was signed by a trusted source (i.e., the IDP device 104B).

The client device 106B responds to the message provided by the example local client device 106A. (Block 926). Additionally or alternatively, the client device 106B performs operations based on the message at block 926. The example machine-readable instructions and/or operations 900 end after block 926.

Figure 10:
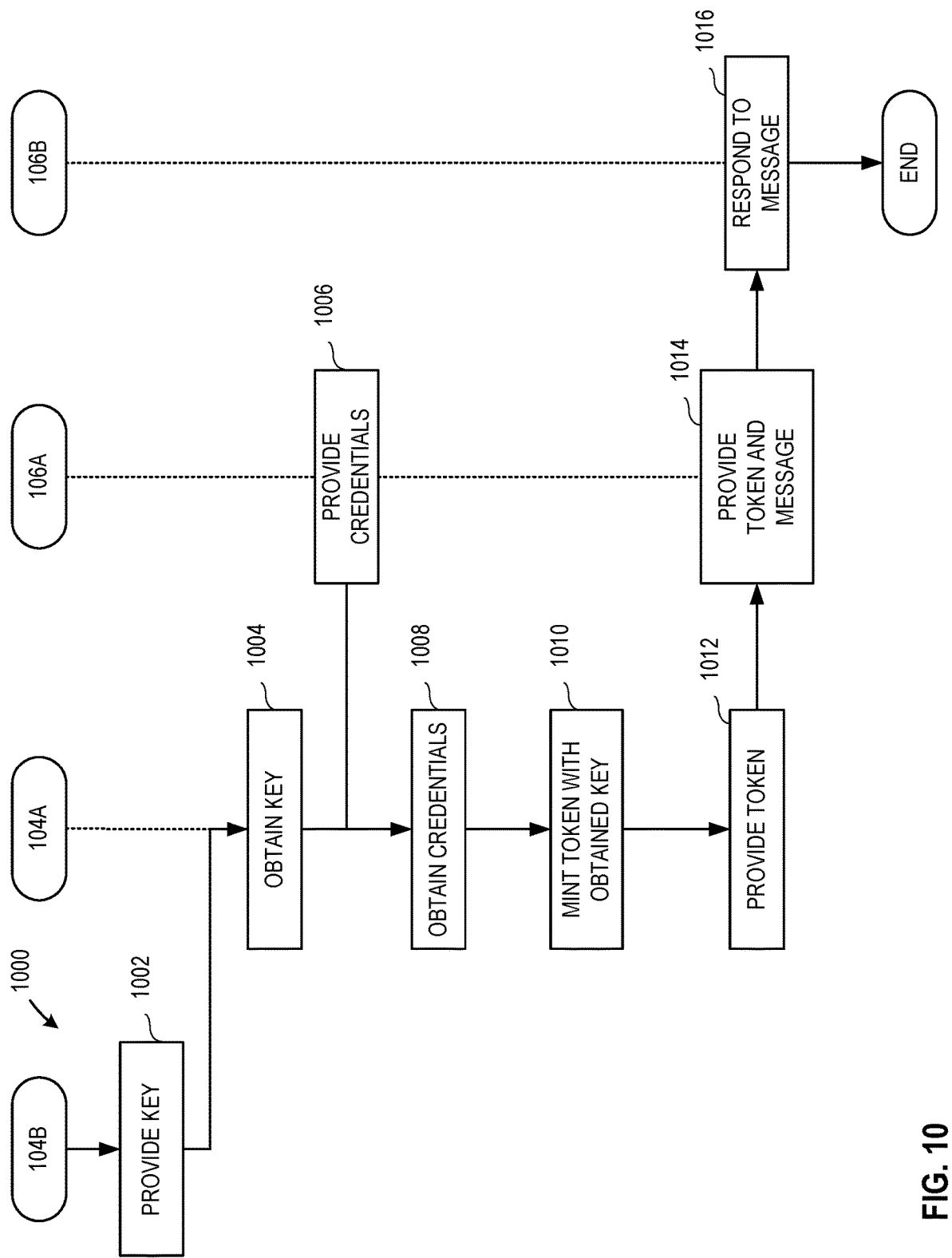
FIG. 10 is a flowchart representative of example machine-readable instructions and/or example operations that may be executed by example processor circuitry to implement the Authorization Realm Blending of FIG. 5.

FIG. 10 is a flowchart representative of example machine-readable instructions and/or example operations that may be executed by example processor circuitry to implement the example authorization realm blending system 500 of FIG. 5. The example machine-readable instructions and/or operations 1000 of FIG. 10 may be implemented after the example trust link 112 has been established as described in FIG. 7. The flowchart of FIG. 10 is organized in four columns labelled "104B", "104A", "106A", and "106B". Accordingly, operations positioned within the "104B" column are implemented by the example IDP device 104B, operations positioned within the "104A" column are implemented by the example IDP device 104A, operations positioned within the "106A" column are implemented by the example client device 106A, and operations positioned within the "106B" column are implemented by the example client device 106B.

The example machine-readable instructions and/or operations 1000 of FIG. 10 begin when the example IDP device 104B provides a signing key to the IDP device 104A. (Block 1002). A signing key refers to an amount of data that is used as input to the cryptographic algorithm. In some examples, a signing key includes a private key.

In some examples, the IDP device 104B additionally provides network description information at block 1002. The type and amount of exchanged network description information may depend on the business needs, available compute resources, etc. In alternative examples, the example IDP device 104A additionally provides a signing key and network information to the example IDP device 104B.

The example IDP device 104A obtains the signing key from the IDP device 104B. (Block 1004). Later, the example local client device 106A provides credentials to the IDP device 104A (Block 1006) to initiate transmission of a message to the client device 106B.

The example IDP device 104A obtains the credentials from the client device 106A. (Block 1008). The example IDP device 104A may obtain the credentials from the local client device 106A at any time after the execution of block 1002.

The example IDP device 104A uses the signing keys of the IDP device 104B to mint a token based on the credentials. (Block 1010). By using the signing keys of the IDP device 104B, the token is interpreted by a client device as being minted by the IDP device 104B (despite being actually minted by the IDP device 104A).

The example IDP device 104A provides the token to the local client device 106A. (Block 1012). In turn, the local client device 106A provides the token and the message to the client device 106B. (Block 1014).

Upon receipt, the client device 106B identifies that the token has been signed with the key of a trust source (i.e., the IDP device 104B). As a result, the client device 106B responds to the message provided by the example local client device 106A. (Block 1016). Additionally or alternatively, the example client device 106B performs operations based on the message at block 1016. The example machine-readable instructions and/or operations 1000 end after block 1016.

The example machine-readable instructions and/or operations 1000 describe an implementation of authorization realm blending where signing keys exchanged between IDP devices include private keys, resulting in IDP devices that can imitate a friend IDP during token minting by encrypting a token with friend IDP private key. In other examples, the signing keys exchanged by IDP devices are public keys and not private keys. In such an example, each IDP device would print tokens with their own private keys and distribute the public key of the friend IDP to the client devices within their original network. Thus, while a token sent by the client device 106A to client device 106B in block 1014 would be signed by the IDP device 104A, the client device 106B would still trust the token and respond to the message. This trust occurs because the IDP device 104B has previously distributed the public key of the IDP device 104A to the client device 106B, allowing the client device 106B to verify the cryptographical signature of the token.

Figure 11:
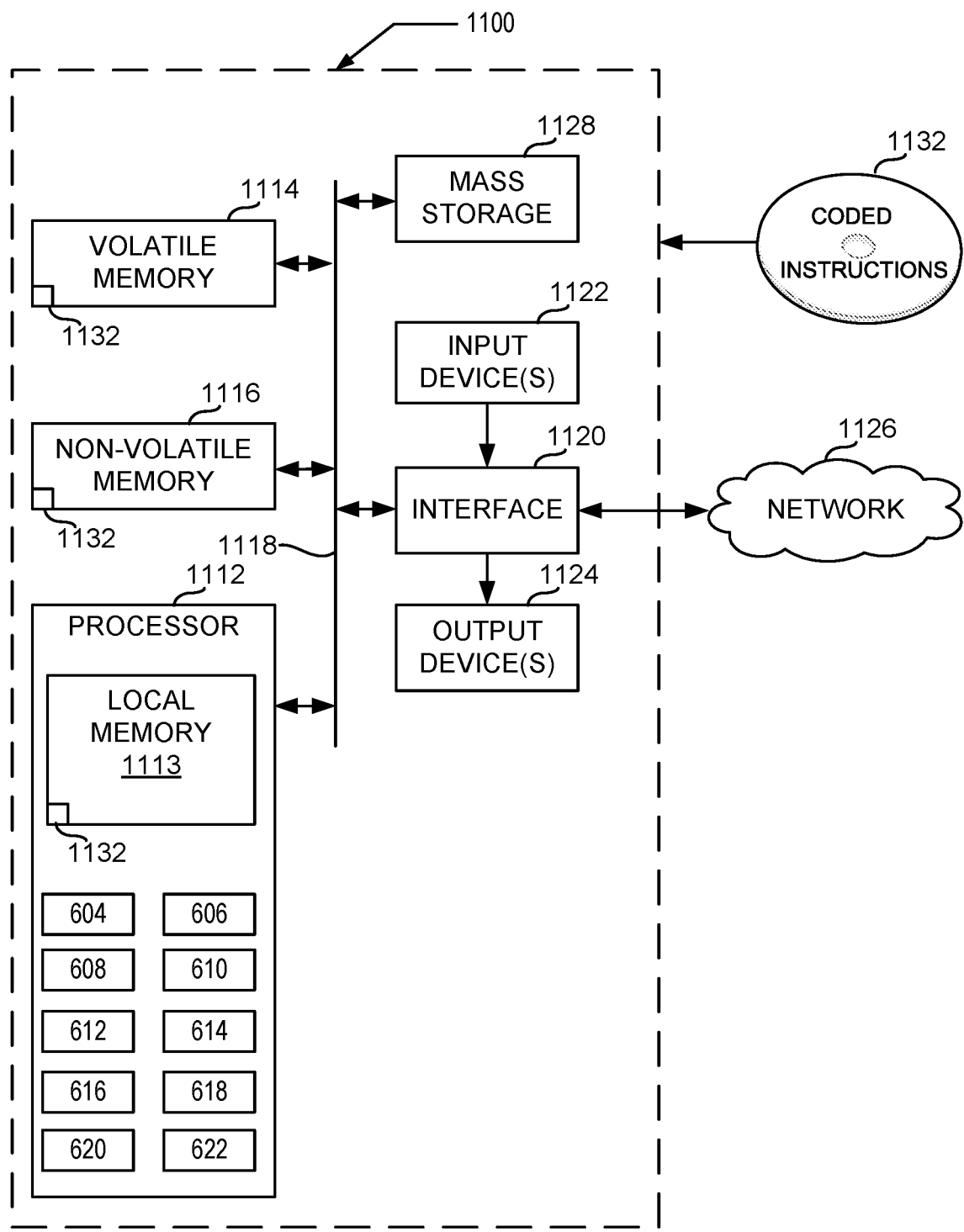
FIG. 11 is a block diagram of an example processing platform including processor circuitry structured to execute the example machine-readable instructions and/or the example operations of FIGS. 7-10 to implement the networks of FIG. 1.

FIG. 11 is a block diagram of an example processor platform 1100 structured to execute and/or instantiate the machine-readable instructions and/or the operations of FIGS. 7-10 to implement the example IDP device 104A of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example trust link former circuitry 604, example policy manager circuitry 606, example mint requester circuitry 608, example token minter circuitry 610, example assertion requester circuitry 612, example assertion provider circuitry 614, example key requester circuitry 616, example key provider circuitry 618, example network information requester circuitry 620, and example network information provider circuitry 622.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine-readable instructions 1132, which may be implemented by the machine-readable instructions of FIGS. 7-10, may be stored in the mass storage device 1128, in the volatile memory 1114, in the non-volatile memory 1116, and/or on a removable non-transitory computer readable storage medium such as a CD or DVD.

Figure 12:
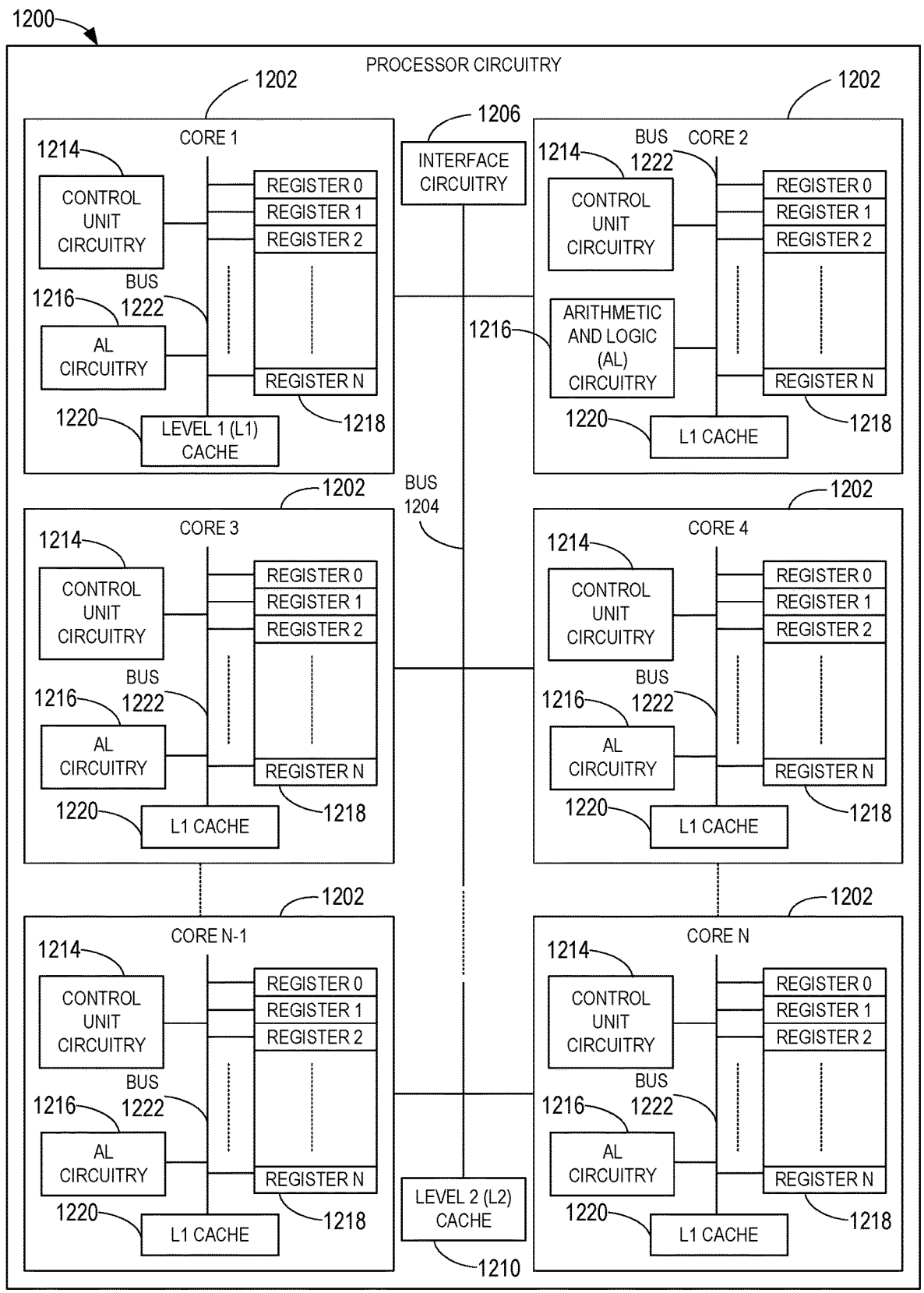
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine-readable instructions of the flowcharts of FIGS. 7-10 to effectively instantiate the example IDP device 104A as logic circuits to perform the operations corresponding to those machine-readable instructions. In some such examples, one or both of the example IDP device 104A is instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine-readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine-readable instructions and/or operations represented by the flowcharts of FIGS. 7-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
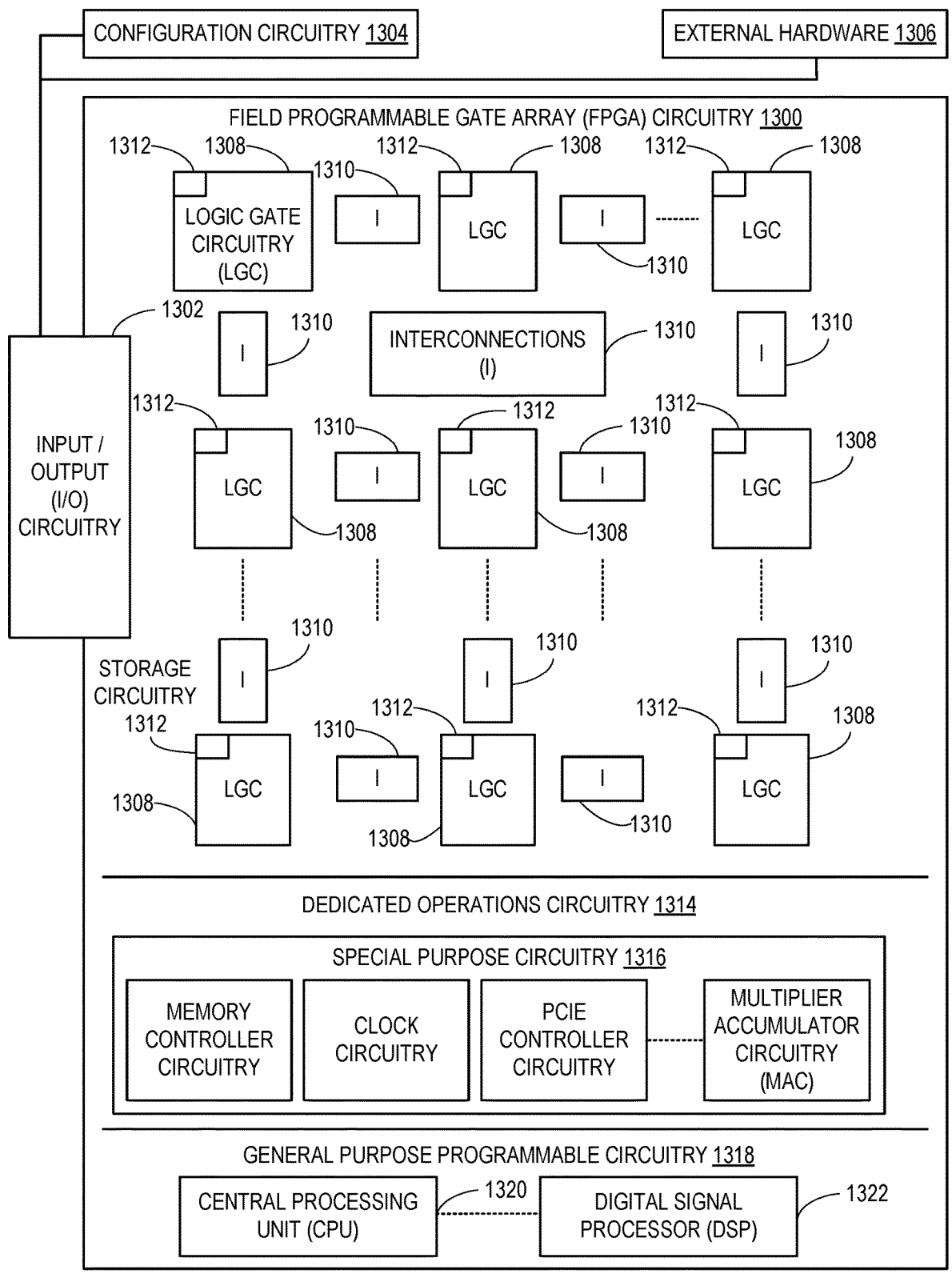
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine-readable instructions. However, once configured, the FPGA circuitry 1300 instantiates the machine-readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine-readable instructions represented by the flowcharts of FIGS. 7-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine-readable instructions represented by the flowcharts of FIGS. 7-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 7-10. As such, the FPGA circuitry 1300 may be structured to effectively instantiate some or all of the machine-readable instructions of the flowcharts of FIGS. 7-10 as dedicated logic circuits to perform the operations corresponding to those software instructions in a dedicated manner analogous to an ASIC. Therefore, the FPGA circuitry 1300 may perform the operations corresponding to the some or all of the machine-readable instructions of FIG. faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine-readable instructions to configure the FPGA circuitry 1300, or portion(s) thereof. In some such examples, the configuration circuitry 1304 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine-readable instructions of FIG. _ and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine-readable instructions represented by the flowcharts of FIGS. 7-10 may be executed by one or more of the cores 1202 of FIG. 12, a second portion of the machine-readable instructions represented by the flowcharts of FIGS. 7-10 may be executed by the FPGA circuitry 1300 of FIG. 13, and/or a third portion of the machine-readable instructions represented by the flowcharts of FIGS. 7-10 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
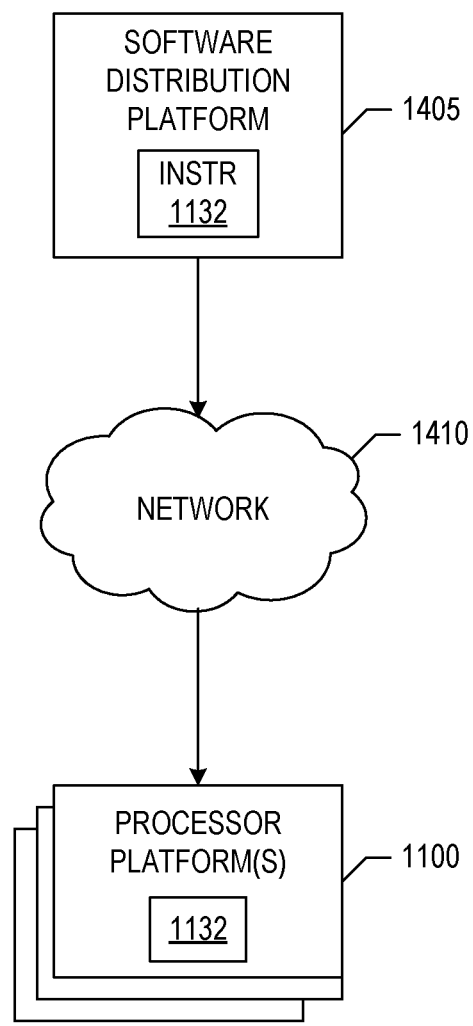
FIG. 14 is a block diagram of an example software distribution platform (e.g., one or more servers) to distribute software (e.g., software corresponding to the example machine-readable instructions of FIGS. 6, 7, 8, 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine-readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine-readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine-readable instructions 1132, which may correspond to the example machine-readable instructions 700, 800, 900, 1000 of FIGS. 7-10, as described above. The one or more servers of the example software distribution platform 1405 are in communication with an example network 1410, which may correspond to any one or more of the Internet and/or any of the example networks 102A, 102B described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 1132 from the software distribution platform 1405. For example, the software, which may correspond to some or all of the example machine-readable instructions 700, 800, 900, 1000 of FIGS. 7-10, may be downloaded to the example processor platform 1100, which is to execute the machine-readable instructions 1132 to implement the example IDP device 104A. In some examples, one or more servers of the software distribution platform 1405 periodically offer, transmit, and/or force updates to the software (e.g., the example machine-readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that share trust and establish communication between networks. Disclosed systems, methods, apparatus, and articles of manufacture improve the efficiency of using a computing device by implementing an example trust link between IDP devices of different networks. Examples described herein use the trust link to enable Remote Token Minting (RTM), Dynamic Transitive Issuer Trust (DTIT), and authorization server blending techniques. Advantageously, the example techniques described in this disclosure that share trust between client devices of different networks without configuring client devices to connect to additional IDP devices. As a result, trust sharing techniques described above and herein offer more scalability and less complexity than previous approaches to share trust. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to share trust between networks are disclosed herein. Further examples and combinations thereof include the following:

Example 1 includes a system to share trust between networks, the system comprising a first network having a first identity provider (IDP) device and a first client device, the first client device in communication with the first IDP device, and a second network having a second IDP device and a second client device, the second client device in communication with the second IDP device, wherein the first IDP device is to establish trust with the second IDP device, the first client device is to provide credentials to the first IDP device, the first IDP device is to cause the second IDP device to mint a token based on the credentials, the second IDP device and the first IDP device are further to provide the token to the first client device, the first client device is further to provide a message and the token to the second client device, and the second client device is to, in response to obtaining the token, perform operations based on the message.

Example 2 includes the system of example 1, wherein to establish trust with the second IDP device the first IDP device is to identify the second IDP device using a first Uniform Resource Link (URL), the second IDP device is to identify the first IDP device using a second URL, the first IDP device and the second IDP device are further to deploy an authorization procedure, and the first IDP device and the second IDP device are to determine a shared communication protocol.

Example 3 includes the system of example 1, wherein the first client device is further to provide audience data to the first IDP device, the audience data to indicate the first client device requests communication with the second client device.

Example 4 includes the system of example 3, wherein the second IDP device is to verify a mint request using the credentials, obtain the audience data, and in response to a determination that the second client device is within an allowed scope of communication of the first client device, mint the token.

Example 5 includes the system of example 1, wherein to cause the second IDP device to mint the token, the first IDP device is to provide a mint request to the second IDP device on behalf of the first client device, the mint request to include the credentials.

Example 6 includes the system of example 1, wherein to cause the second IDP device to mint the token the first IDP device is to provide a One Time Password (OTP) to the first client device, and the first client device is to provide a mint request to the second IDP device, mint request to include the credentials and the OTP.

Example 7 includes the system of example 1, wherein to cause the second IDP device to mint the token the first IDP device is to provide an assertion to the first client device, and the first client device is to provide a mint request to the second IDP device, mint request to include the credentials and the assertion.

Example 8 includes an apparatus to share trust between networks, the apparatus comprising trust link former circuitry to form trust with an identity provider (IDP) device separate from the apparatus, interface circuitry to obtain credentials from a client device, the client device and the apparatus connected in a network that does not include the IDP device, and mint requester circuitry to cause the IDP device to mint a token based on the credentials, wherein the interface circuitry further to obtain the token from the IDP device, and forward the token to the client device.

Example 9 includes the apparatus of example 8, wherein to form trust with the IDP device, the trust link former circuitry is further to identify the IDP device using a first Uniform Resource Link (URL), initiate an authorization procedure with the IDP device, and in response to a determination the authorization procedure is complete, propose a shared communication protocol for use with the IDP device.

Example 10 includes the apparatus of example 8, wherein the client device is a first client device, the network is a first network, the IDP device is in a second network, the interface circuitry is further to obtain audience data from the first client device, the audience data to describe a second client device in the second network, and the mint requester circuitry is further to cause the IDP device to mint the token based on the credentials and the audience data.

Example 11 includes the apparatus of example 10, wherein to cause the IDP device to mint the token, the mint requester circuitry is to provide a mint request to the IDP device on behalf of the first client device, the mint request to include the credentials and the audience data.

Example 12 includes the apparatus of example 10, wherein to cause the IDP device to mint the token, the mint requester circuitry is to provide a One Time Password (OTP) to the client device, and instruct the client device to provide a mint request to the IDP device using the credentials, the audience data, and the OTP.

Example 13 includes the apparatus of example 10, wherein to cause the IDP device to mint the token, the mint requester circuitry is to provide an assertion to the client device, and instruct the client device to provide a mint request to the IDP device using the credentials, the audience data, and the assertion.

Example 14 includes an apparatus to share trust between networks, the apparatus comprising means for forming trust with an identity provider (IDP) device separate from the apparatus, means for communicating to obtain credentials from a client device, the client device and the apparatus connected in a network that does not include the IDP device, and means for causing the IDP device to mint a token based on the credentials, wherein the means for communicating is further to obtain the token from the IDP device, and forward the token to the client device.

Example 15 includes the apparatus of example 14, wherein to establish trust between networks, the means for forming trust is further to identify the IDP device using a first Uniform Resource Link (URL), initiate an authorization procedure with the IDP device, and in response to a completion of the authorization procedure, propose a shared communication protocol for use with the IDP device.

Example 16 includes the apparatus of example 14, wherein the client device is a first client device, the network is a first network, the IDP device is in a second network, the means for communicating is further to obtain audience data from the first client device, the audience data to describe a second client device in the second network, and the means for causing the IDP device to mint a token is further to cause the IDP device to mint the token based on the credentials and the audience data.

Example 17 includes the apparatus of example 16, the means for causing the IDP device to mint a token is further to provide a mint request to the IDP device on behalf of the first client device, the mint request to include the credentials and the audience data.

Example 18 includes the apparatus of example 16, wherein the means for causing the IDP device to mint a token is further to provide a One Time Password (OTP) to the client device, and instruct the client device to provide a mint request to the IDP device using the credentials, the audience data, and the OTP.

Example 19 includes the apparatus of example 16, wherein the means for causing the IDP device to mint a token is further to provide an assertion to the client device, and instruct the client device to provide a mint request to the IDP device using the credentials, the audience data, and the assertion.

Example 20 includes a non-transitory machine-readable storage medium comprising instructions that, when executed, cause processor circuitry to at least form trust with an identity provider (IDP) device separate from the processor circuitry, obtain credentials from a client device, the client device and the processor circuitry connected in a network that does not include from the IDP device, cause the IDP device to mint a token based on the credentials, obtain the token from the IDP device, and forward the token to the client device.

Example 21 includes the non-transitory machine-readable storage medium of example 20, wherein to establish trust between networks, the instructions cause the processor circuitry to identify the IDP device using a first Uniform Resource Link (URL), initiate an authorization procedure with the IDP device, and in response to a determination the authorization procedure is complete, propose a shared communication protocol for use with the IDP device.

Example 22 includes the non-transitory machine-readable storage medium of example 20, wherein the client device is a first client device, the network is a first network, the IDP device is in a second network, and the instructions cause the processor circuitry to obtain audience data from the first client device, the audience data to describe a second client device in the second network, and cause the IDP device to mint the token based on the credentials and the audience data.

Example 23 includes the non-transitory machine-readable storage medium of example 22, wherein to cause the IDP device to mint the token, the instructions cause the processor circuitry to provide a mint request to the IDP device on behalf of the first client device, the mint request to include the credentials and the audience data.

Example 24 includes the non-transitory machine-readable storage medium of example 22, wherein to cause the IDP device to mint the token, the instructions cause the processor circuitry to provide a One Time Password (OTP) to the client device, and instruct the client device to provide a mint request to the IDP device using the credentials, the audience data, and the OTP.

Example 25 includes the non-transitory machine-readable storage medium of example 22, wherein to cause the IDP device to mint the token, the instructions cause the processor circuitry to provide an assertion to the client device, and instruct the client device to provide a mint request to the IDP device using the credentials, the audience data, and the assertion.

Example 26 includes a method to share trust between networks, the method comprising forming, with a first identity provider (IDP) device, trust with a second IDP device separate from the first IDP device, obtaining, with the first IDP device, credentials from a client device, the client device and the first IDP device connected in a network that does not include second IDP device, causing, with the first IDP device, the second IDP device to mint a token based on the credentials, obtaining, with the first IDP device, the token from the IDP device, and forwarding, with the first IDP device, the token to the client device.

Example 27 includes the method of example 26, further including identifying, with the first IDP device, the IDP device using a first Uniform Resource Link (URL), initiating, with the first IDP device, an authorization procedure with the second IDP device, and in response a determination the authorization procedure is complete, proposing, with the first IDP device, a shared communication protocol for use with the second IDP device.

Example 28 includes the method of example 26, wherein the client device is a first client device, the network is a first network, the second IDP device is in a second network, and the method further includes obtaining, with the first IDP device, audience data from the first client device, the audience data to describe a second client device in the second network, and causing, with the first IDP device, the second IDP device to mint the token based on the credentials and the audience data.

Example 29 includes the method of example 28, wherein causing the second IDP device to mint the token further includes providing, with the first IDP device, a mint request to the second IDP device on behalf of the first client device, the mint request to include the credentials and the audience data.

Example 30 includes the method of example 28, wherein causing the second IDP device to mint the token further includes providing, with the first IDP device, a One Time Password (OTP) to the client device, and instructing, with the first IDP device, the client device to provide a mint request to the IDP device using the credentials, the audience data, and the OTP.

Example 31 includes the method of example 28, wherein causing the second IDP device to mint the token further includes providing, with the first IDP device, an assertion to the client device, and instructing, with the first IDP device, the client device to provide a mint request to the IDP device using the credentials, the audience data, and the assertion.

Example 32 includes a system to share trust between networks, the system comprising a first network having a first identity provider (IDP) device and a first client device, the first client device in communication with the first IDP device, and a second network having a second IDP device and a second client device, the second client device in communication with the second IDP device, wherein the first IDP device is to establish trust with the second IDP device, obtain assertion data from the second IDP device, obtain credentials from the first client device, mint a token based on the credentials, the token to include the assertion data from the second IDP device, and provide the token to the first client device, the first client device is to provide a message and the token to the second client device, and the second client device is to, in response to a determination that the token includes the assertion data from the second IDP device, perform operations based on the message.

Example 33 includes the system of example 32, wherein to establish trust with the second IDP device the first IDP device is configured to identify the second IDP device using a first Uniform Resource Link (URL), the second IDP device is configured to identify the first IDP device using a second URL, the first IDP device and the second IDP device are further to deploy an authorization procedure, and the first IDP device and the second IDP device are to determine a shared communication protocol.

Example 34 includes the system of example 32, wherein the assertion data from the second IDP device includes a first timestamp and a second timestamp, the first timestamp and second timestamp to define when the assertion data is valid and when the assertion data is expired.

Example 35 includes the system of example 34, wherein the first IDP device is further to determine when the credentials from the first client device were obtained, and mint, in response to a determination that the credentials were obtained when the assertion data is valid, the token with the assertion data.

Example 36 includes the system of example 34, wherein the first IDP device is further to determine when the credentials from the first client device were obtained, and request, in response to a determination that the credentials were obtained when the assertion data is expired, a new assertion from the second IDP device.

Example 37 includes the system of example 34, wherein the assertion data is first assertion data, and the first IDP device is further to request a new assertion from the second IDP device at regular intervals, the regular interval based on when a given assertion expires.

Example 38 includes the system of example 32, wherein the assertion data is first assertion data, and the first IDP device is further to provide second assertion data to the second IDP device.

Example 39 includes an apparatus to share trust between networks, the apparatus comprising trust link former circuitry to form trust with an identity provider (IDP) device separate from the apparatus, assertion requester circuitry to request assertion data from the IDP device, interface circuitry to obtain credentials from a client device, the client device and the apparatus connected in a network that does not include the IDP device, and token minter circuitry to mint a token based on the credentials, the token to include the assertion data from the IDP device, wherein the interface circuitry is further to provide the token to the client device.

Example 40 includes the apparatus of example 39, wherein to form trust with the IDP device, the trust link former circuitry is further to identify the IDP device using a first Uniform Resource Link (URL), deploy an authorization procedure with the IDP device, and determine a shared communication protocol with the IDP device.

Example 41 includes the apparatus of example 39, wherein the assertion data from the IDP device includes a first timestamp and a second timestamp, the first timestamp and second timestamp to define when the assertion data is valid and when the assertion data is expired.

Example 42 includes the apparatus of example 41, wherein the token minter circuitry is further to determine when the credentials from the client device were obtained, and mint, in response to a determination that the credentials were obtained when the assertion data is valid, the token with the assertion data.

Example 43 includes the apparatus of example 41, wherein the token minter circuitry is further to determine when the credentials from the client device were obtained, and cause, in response to a determination that the credentials were obtained when the assertion data is expired, the assertion requester circuitry to request a new assertion from the IDP device.

Example 44 includes the apparatus of example 41, wherein the assertion data is first assertion data, and the assertion requester circuitry is further to request a new assertion from the IDP device at regular intervals, the regular interval based on when a given assertion expires.

Example 45 includes the apparatus of example 39, wherein the assertion data is first assertion data, and the apparatus further includes assertion provider circuitry to provide second assertion data to the IDP device.

Example 46 includes an apparatus to share trust between networks, the apparatus comprising means for forming trust with an identity provider (IDP) device separate from the apparatus, means for requesting assertion data to obtain a second assertion from the IDP device, means for communicating to obtain credentials from a client device, the client device and the apparatus connected in a network does not include the IDP device, and means for minting a token based on the credentials, the token to include the assertion data from the second IDP device, wherein the means for communicating is further to provide the token to the client device.

Example 47 includes the apparatus of example 46, wherein the means for forming trust is further to identify the IDP device using a first Uniform Resource Link (URL), deploy an authorization procedure with the IDP device, and determine a shared communication protocol with the IDP device.

Example 48 includes the apparatus of example 46, wherein the assertion data from the second IDP device includes a first timestamp and a second timestamp, the first timestamp and second timestamp to define when the assertion data is valid and when the assertion data is expired.

Example 49 includes the apparatus of example 48, wherein the means for minting the token is further to determine when the credentials from the client device were obtained, and mint, in response to a determination that the credentials were obtained when the assertion data is valid, the token with the assertion data.

Example 50 includes the apparatus of example 48, wherein the means for minting the token is further to determine when the credentials from the client device were obtained, and cause, in response to a determination that the credentials were obtained when the assertion data is expired, the means for requesting assertion data to request new assertion data from the IDP device.

Example 51 includes the apparatus of example 48, wherein the assertion data is first assertion data, and the means for requesting assertion data is further to request new assertion data from the IDP device at regular intervals, the regular interval based on when the first assertion data expires.

Example 52 includes the apparatus of example 48, wherein the assertion data is first assertion data, and the apparatus further includes means for providing a second assertion to the IDP device.

Example 53 includes a non-transitory machine-readable storage medium comprising instructions that, when executed, cause processor circuitry to at least form trust with an identity provider (IDP) device separate from the processor circuitry, request assertion data from the IDP device, obtain credentials from a client device, the client device and the processor circuitry connected in a network that does not include the IDP device, and mint a token based on the credentials, the token to include the assertion data from the IDP device, and provide the token to the client device.

Example 54 includes the non-transitory machine-readable storage medium of example 53, wherein to form trust with the IDP device, the instructions cause the processor circuitry to identify the IDP device using a first Uniform Resource Link (URL), deploy an authorization procedure with the IDP device, and determine a shared communication protocol with the IDP device.

Example 55 includes the non-transitory machine-readable storage medium of example 53, wherein the assertion data from the IDP device includes a first timestamp and a second timestamp, the first timestamp and second timestamp to define when the assertion data is valid and when the assertion data is expired.

Example 56 includes the non-transitory machine-readable storage medium of example 55, wherein the instructions cause the processor circuitry to determine when the credentials from the client device were obtained, and mint, in response to a determination that the credentials were obtained when the assertion data is valid, the token with the assertion data.

Example 57 includes the non-transitory machine-readable storage medium of example 55, wherein the instructions cause the processor circuitry to determine when the credentials from the client device were obtained, and request, in response to a determination that the credentials were obtained when the assertion data is expired, a new assertion from the IDP device.

Example 58 includes the non-transitory machine-readable storage medium of example 55, wherein the assertion data is first assertion data, and the instructions cause the processor circuitry to request a new assertion from the IDP device at regular intervals, the regular interval based on when a given assertion expires.

Example 59 includes the non-transitory machine-readable storage medium of example 53, wherein the assertion data is first assertion data, and the instructions cause the processor circuitry to provide second assertion data to the IDP device.

Example 60 includes a method to share trust between networks, the method comprising forming, with a first identity provider (IDP) device, trust with a second IDP device separate from the first IDP device, requesting, with the first IDP device, assertion data from the second IDP device, obtaining, with the first IDP device, credentials from a client device, the client device and the first IDP device connected in a network separate from the second IDP device, and minting, with the first IDP device, a token based on the credentials, the token to include the assertion data from the second IDP device, and providing, with the first IDP device, the token to the client device.

Example 61 includes the method of example 60, wherein to form trust with the second IDP device, the method further includes identifying, with the first IDP device, the second IDP device using a first Uniform Resource Link (URL), deploying, with the first IDP device, an authorization procedure with the second IDP device, and determining, with the first IDP device, a shared communication protocol with the second IDP device.

Example 62 includes the method of example 60, wherein the assertion data from the second IDP device includes a first timestamp and a second timestamp, the first timestamp and second timestamp to define when the assertion data is valid and when the assertion data is expired.

Example 63 includes the method of example 62, wherein the method further includes determining, with the first IDP device, when the credentials from the client device were obtained, and minting, with the first IDP device, in response to a determination that the credentials were obtained when the assertion data is valid, the token with the assertion data.

Example 64 includes the method of example 62, wherein the method further includes determining, with the first IDP device, when the credentials from the client device were obtained, and requesting, with the first IDP device and in response to a determination that the credentials were obtained when the assertion data is expired, a new assertion from the second IDP device.

Example 65 includes the method of example 62, wherein the method further includes requesting, with the first IDP device, a new assertion from the second IDP device at regular intervals, the regular interval based on when a given assertion expires.

Example 66 includes the method of example 60, wherein the assertion data is first assertion data, and the method further includes providing, with the first IDP device, second assertion data to the second IDP device.

Example 67 includes a system to share trust between networks, the system comprising a first network having a first identity provider (IDP) device and a first client device, the first client device in communication with the first IDP device, and a second network having a second IDP device and a second client device, the second client device in communication with the second IDP device, wherein the first IDP device is to establish trust with the second IDP device, obtain a signing key with the second IDP device, obtain credentials from the first client device, mint a token using the signing key of the second IDP device, and provide the token to the first client device, the first client device is to provide a message and the token to the second client device, and the second client device is to, in response to obtaining the token, perform an operation based on the message.

Example 68 includes the system of example 67, wherein to establish trust with the second IDP device the first IDP device is configured to identify the second IDP device using a first Uniform Resource Link (URL), the second IDP device is configured to identify the first IDP device using a second URL, the first IDP device and the second IDP device are further to deploy an authorization procedure, and the first IDP device and the second IDP device are to determine a shared communication protocol.

Example 69 includes the system of example 67, wherein the signing key is a first signing key, and the first IDP device is further to provide a second signing key to the second IDP device.

Example 70 includes the system of example 67, wherein the first IDP device is further to provide first network description information to the second IDP device, and the second IDP device is further to provide second network description information to the first IDP device.

Example 71 includes the system of example 70, wherein the first network description information describes one or more of an amount, type, location, and role of client devices within the first network.

Example 72 includes an apparatus to share trust between networks, the apparatus comprising trust link former circuitry to form trust with an identity provider (IDP) device separate from the apparatus, key requester circuitry to request a signing key from the IDP device, interface circuitry to obtain credentials from a client device, the client device and the apparatus connected in a network that does not include the IDP device, and token minter circuitry to mint a token using the signing key from the IDP device, wherein the interface circuitry is further to provide the token to the client device.

Example 73 includes the apparatus of example 72, wherein to wherein to form trust with the IDP device, the trust link former circuitry is further to identify the IDP device using a first Uniform Resource Link (URL), deploy an authorization procedure with the IDP device, and determine a shared communication protocol with the IDP device.

Example 74 includes the apparatus of example 72, wherein the signing key is a first signing key, and the apparatus further includes key provider circuitry to provide a second signing key to the IDP device.

Example 75 includes the apparatus of example 72, further including network information provider circuitry to provide first network description information to the IDP device, and network information requester circuitry to request second network description information from the IDP device.

Example 76 includes the apparatus of example 75, wherein the first network description information describes one or more of an amount, type, location, and role of client devices within the network.

Example 77 includes an apparatus to share trust between networks, the apparatus comprising means for forming trust with an identity provider (IDP) device separate from the apparatus, means for requesting a signing key from the IDP device, means for communicating to obtain credentials from a client device, the client device and the apparatus connected in a network that does not include the IDP device, and means for minting a token using the signing key from the IDP device, wherein the means for communicating is further to provide the token to the client device.

Example 78 includes the apparatus of example 77, wherein to wherein to form trust with the IDP device, the means for forming trust is further to identify the IDP device using a first Uniform Resource Link (URL), deploy an authorization procedure with the IDP device, and determine a shared communication protocol with the IDP device.

Example 79 includes the apparatus of example 77, wherein the signing key is a first signing key, and the apparatus further includes means for providing a second signing key to the IDP device.

Example 80 includes the apparatus of example 77, further including means for providing first network description information to the IDP device, and means for requesting second network description information from the IDP device.

Example 81 includes the apparatus of example 80, wherein the first network description information describes one or more of an amount, type, location, and role of client devices within the network.

Example 82 includes a non-transitory machine-readable storage medium comprising instructions that, when executed, cause processor circuitry to at least form trust with an identity provider (IDP) device separate from processor circuitry, request a signing key from the IDP device, obtain credentials from a client device, the client device and the processor circuitry connected in a network that does not include the IDP device, mint a token using the signing key from the IDP device, and provide the token to the client device.

Example 83 includes the non-transitory machine-readable storage medium of example 82, wherein to form trust with the IDP device, the processor circuitry is to identify the IDP device using a Uniform Resource Link (URL), deploy an authorization procedure with the IDP device, and determine a shared communication protocol with the IDP device.

Example 84 includes the non-transitory machine-readable storage medium of example 82, wherein the signing key is a first signing key, and the instructions cause the processor circuitry to provide a second signing key to the IDP device.

Example 85 includes the non-transitory machine-readable storage medium of example 82, wherein the instructions cause the processor circuitry to provide first network description information to the IDP device, and request second network description information from the IDP device.

Example 86 includes the non-transitory machine-readable storage medium of example 85, wherein the first network description information describes one or more of an amount, type, location, and role of client devices within the network.

Example 87 includes a method to share trust between networks, the method comprising forming, with a first an identity provider (IDP) device, trust with a second IDP device separate from the first IDP device, requesting, with the first IDP device, a signing key from the second IDP device, obtaining, with the first IDP device, credentials from a client device, the client device and the first IDP connected in a network separate from the second IDP device, minting, with the first IDP device, a token using the signing key from the second IDP device, and providing the token to the client device.

Example 88 includes the method of example 87, wherein forming trust with the second IDP device further includes identifying, with the first IDP device, the second IDP device using a Uniform Resource Link (URL), deploying, with the first IDP device, an authorization procedure with the IDP device, and determining, with the first IDP device, a shared communication protocol with the IDP device.

Example 89 includes the method of example 87, wherein the signing key is a first signing key, and the method further includes providing, with the first IDP device, a second signing key to the second IDP device.

Example 90 includes the method of example 87, further including providing, with the first IDP device, first network description information to the second IDP device, and requesting, with the first IDP device, second network description information from the IDP device.

Example 91 includes the method of example 90, wherein the first network description information describes one or more of an amount, type, location, and role of client devices within the network.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system to share trust between networks, the system comprising:
   a first network having a first identity provider (IDP) device and a first client device, the first client device in communication with the first IDP device; and
   a second network having a second IDP device and a second client device, the second client device in communication with the second IDP device, wherein:
   the first IDP device is to establish trust with the second IDP device;
   the first client device is to provide credentials to the first IDP device;
   the first IDP device is to cause the second IDP device to mint a token based on the credentials;
   the second IDP device and the first IDP device are further to provide the token to the first client device;
   the first client device is further to provide a message and the token to the second client device; and
   the second client device is to, in response to obtaining the token, perform operations based on the message.

2. The system of claim 1, wherein to establish trust with the second IDP device:
   the first IDP device is to identify the second IDP device using a first Uniform Resource Link (URL);
   the second IDP device is to identify the first IDP device using a second URL;
   the first IDP device and the second IDP device are further to deploy an authorization procedure; and
   the first IDP device and the second IDP device are to determine a shared communication protocol.

3. The system of claim 1, wherein the first client device is further to provide audience data to the first IDP device, the audience data to indicate the first client device requests communication with the second client device.

4. The system of claim 3, wherein the second IDP device is to:
   verify a mint request using the credentials;
   obtain the audience data; and
   in response to a determination that the second client device is within an allowed scope of communication of the first client device, mint the token.

5. The system of claim 1, wherein to cause the second IDP device to mint the token, the first IDP device is to provide a mint request to the second IDP device on behalf of the first client device, the mint request to include the credentials.

6. The system of claim 1, wherein to cause the second IDP device to mint the token:
   the first IDP device is to provide a One Time Password (OTP) to the first client device; and
   the first client device is to provide a mint request to the second IDP device, mint request to include the credentials and the OTP.

7. The system of claim 1, wherein to cause the second IDP device to mint the token:

the first IDP device is to provide an assertion to the first client device; and the first client device is to provide a mint request to the second IDP device, mint request to include the credentials and the assertion.

\* \* \* \* \*